US012589595B2

(12) United States Patent
Yokoi et al.

(10) Patent No.: US 12,589,595 B2
(45) Date of Patent: *Mar. 31, 2026

(54) LIQUID DISCHARGE APPARATUS AND STORAGE DEVICE

(71) Applicant: SEIKO EPSON CORPORATION, Tokyo (JP)

(72) Inventors: Takanori Yokoi, Yamagata-mura (JP); Yasuhiro Hosokawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 224 days.

This patent is subject to a terminal disclaimer.

(21) Appl. No.: 18/457,387

(22) Filed: Aug. 29, 2023

(65) Prior Publication Data

US 2024/0066885 A1 Feb. 29, 2024

(30) Foreign Application Priority Data

Aug. 31, 2022 (JP) ................................ 2022-138009

(51) Int. Cl.
*B41J 2/175* (2006.01)

(52) U.S. Cl.
CPC ........... *B41J 2/17566* (2013.01); *B41J 2/175* (2013.01); *B41J 2/17509* (2013.01); *B41J 2/17513* (2013.01); *B41J 2002/17579* (2013.01)

(58) Field of Classification Search
CPC .... B41J 2/17566; B41J 2/175; B41J 2/17509; B41J 2/17513; B41J 2002/17579
See application file for complete search history.

(56) References Cited

U.S. PATENT DOCUMENTS

| | | | | |
|---|---|---|---|---|
| 2021/0094307 | A1 | 4/2021 | Yonemura | |
| 2021/0096016 | A1 | 4/2021 | Yonemura | |
| 2022/0134766 | A1 | 5/2022 | Shinkawa | |
| 2024/0066886 | A1 * | 2/2024 | Yokoi .................. | B41J 2/17513 |
| 2024/0286415 | A1 * | 8/2024 | Hosokawa ........... | B41J 2/17513 |

FOREIGN PATENT DOCUMENTS

| | | | |
|---|---|---|---|
| JP | 2021-056079 | A | 4/2021 |

* cited by examiner

*Primary Examiner* — Geoffrey S Mruk
(74) *Attorney, Agent, or Firm* — Spencer Fane LLP

(57) ABSTRACT

A liquid discharge apparatus includes a first storage section that stores a liquid in a space between a first surface and a second surface, a second storage section that stores a liquid in a space between a third surface and a fourth surface, a first flexible printed substrate including a first wiring portion including a first electrode provided on the first surface and a second wiring portion including a second electrode provided on the second surface, and a second flexible printed substrate including a third wiring portion including a third electrode provided on the third surface, the second wiring portion has a first shield electrode that is located between the second electrode and the third wiring portion for shielding the second electrode, and the third wiring portion does not have a shield electrode for shielding the third electrode between the third electrode and the second wiring portion.

12 Claims, 14 Drawing Sheets

LIQUID DISCHARGE APPARATUS AND STORAGE DEVICE

The present application is based on, and claims priority from JP Application Serial Number 2022-138009, filed Aug. 31, 2022, the disclosure of which is hereby incorporated by reference herein in its entirety.

BACKGROUND

1. Technical Field

The present disclosure relates to a liquid discharge apparatus and a storage device.

2. Related Art

A technique for detecting a remaining amount of an object stored in a container has been proposed. For example, in JP-A-2021-056079, a technique relating to a detection device including a container for storing an object between a first surface and a second surface, a first electrode disposed on the first surface, a second electrode disposed on the second surface, a shielding material for covering the first electrode, a shielding material for covering the second electrode, and a detection section for detecting a remaining amount of the object stored in the container based on a potential of the first electrode and a potential of the second electrode has been proposed.

However, in the technique of the related art, since both the first electrode and the second electrode attached to the container are covered with the shielding materials, in a case where a plurality of containers are disposed side by side, it becomes necessary to provide a space between one container among the plurality of containers and the other container adjacent to the one container. For this reason, in the technique of the related art, in a case where the plurality of containers are disposed side by side, a problem arises that a space for accommodating the plurality of containers becomes large.

SUMMARY

In order to solve the above problems, a liquid discharge apparatus according to an aspect of the present disclosure includes a first storage section that stores a liquid in a space between a first surface and a second surface facing the first surface, a second storage section that stores a liquid in a space between a third surface and a fourth surface facing the third surface, a first discharging section that discharges the liquid supplied from the first storage section, a second discharging section that discharges the liquid supplied from the second storage section, a first flexible printed substrate for detecting a remaining amount of the liquid in the first storage section, and a second flexible printed substrate for detecting a remaining amount of the liquid in the second storage section, in which the first flexible printed substrate includes a first wiring portion including a first electrode provided on the first surface, and a second wiring portion including a second electrode provided on the second surface, the second flexible printed substrate includes a third wiring portion including a third electrode provided on the third surface, and a fourth wiring portion including a fourth electrode provided on the fourth surface, the first storage section and the second storage section are disposed side by side such that the second surface is located between the first surface and the third surface, the second wiring portion has a first shield electrode that is located between the second electrode and the third wiring portion for shielding the second electrode, and the third wiring portion does not have a shield electrode for shielding the third electrode between the third electrode and the second wiring portion.

In addition, a storage device according to another aspect of the present disclosure includes a first storage section that stores an object in a space between a first surface and a second surface facing the first surface, a second storage section that stores an object in a space between a third surface and a fourth surface facing the third surface, a first flexible printed substrate for detecting a remaining amount of the object in the first storage section, and a second flexible printed substrate for detecting a remaining amount of the object in the second storage section, in which the first flexible printed substrate includes a first wiring portion including a first electrode provided on the first surface, and a second wiring portion including a second electrode provided on the second surface, the second flexible printed substrate includes a third wiring portion including a third electrode provided on the third surface, and a fourth wiring portion including a fourth electrode provided on the fourth surface, the first storage section and the second storage section are disposed side by side such that the second surface is located between the first surface and the third surface, the second wiring portion has a first shield electrode that is located between the second electrode and the third wiring portion for shielding the second electrode, and the third wiring portion does not have a shield electrode for shielding the third electrode between the third electrode and the second wiring portion.

DESCRIPTION OF EMBODIMENTS

In the following, embodiments for carrying out the present disclosure will be explained with reference to the accompanying drawings. However, in each drawing, the size and scale of each section are appropriately different from the actual ones. In addition, since the embodiments described in the following are preferred specific examples of the present disclosure, various technically preferable limitations are attached, but the scope of the present disclosure is not limited to the embodiments unless otherwise stated to specifically limit the present disclosure in the following explanation.

A. First Embodiment

In the following, an ink jet printer 100 according to a first embodiment will be explained.

A. 1. Overview of Ink Jet Printer

Figure 1:
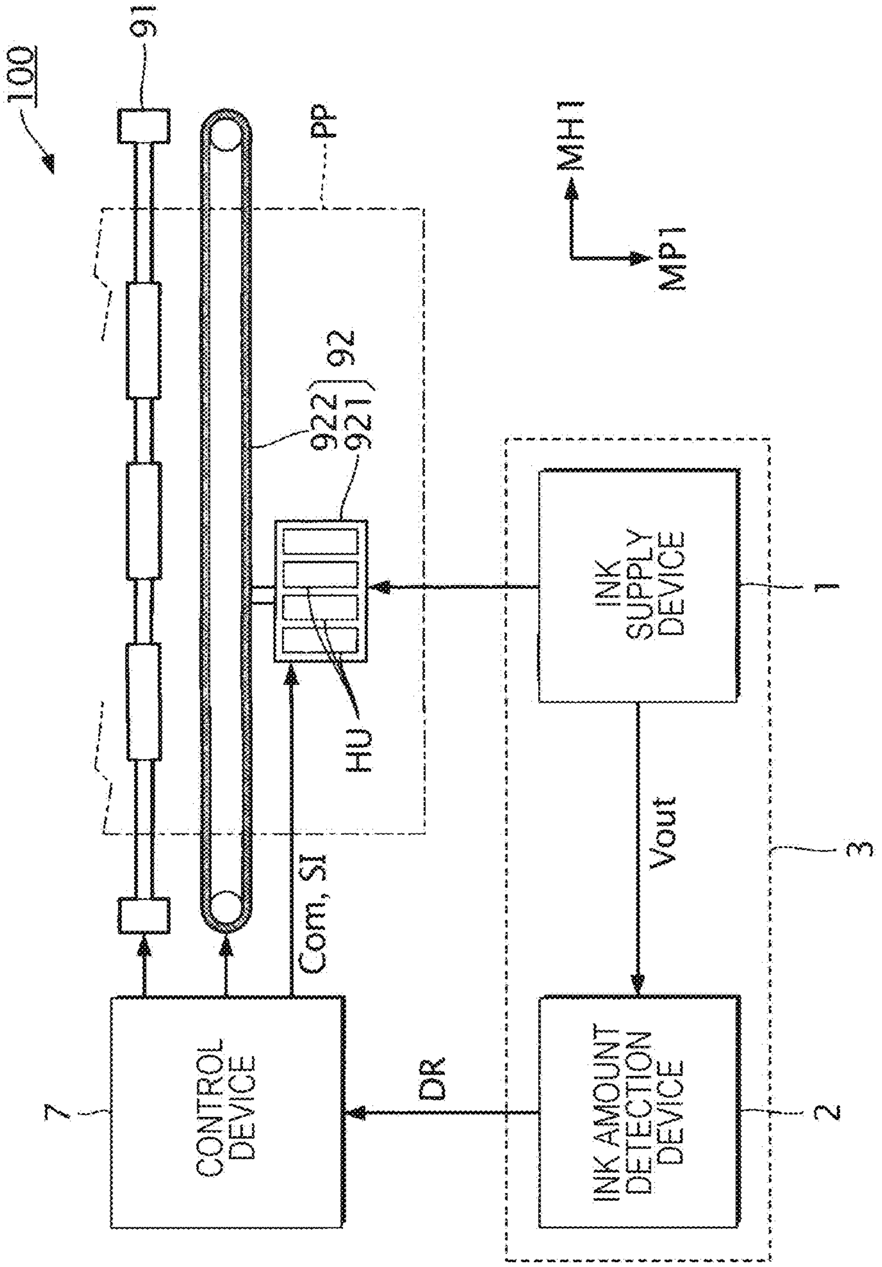
FIG. 1 is a configuration diagram showing an example of an ink jet printer according to a first embodiment of the present disclosure.

FIG. 1 is an explanatory diagram showing the ink jet printer 100 according to the present embodiment. The ink jet printer 100 is an ink jet printing apparatus that discharges ink IK onto a medium PP. The medium PP is typically printing paper, but any printing target, such as a resin film or fabric, can be used as the medium PP.

In the present embodiment, the ink jet printer 100 is an example of a "liquid discharge apparatus", and the ink IK is an example of a "liquid" and an "object".

As shown in FIG. 1, the ink jet printer 100 includes a storage device 3 including an ink supply device 1 and an ink amount detection device 2, a control device 7, a plurality of liquid discharge heads HU, a movement mechanism 91, and a transport mechanism 92.

The control device 7 includes, for example, a processing circuit such as a CPU or FPGA and a storage circuit such as a semiconductor memory, and controls each element of the ink jet printer 100. Here, the CPU is an abbreviation of Central Processing Unit, and the FPGA is an abbreviation of Field Programmable Gate Array.

The movement mechanism 91 transports the medium PP in a sub scanning direction MP1 based on the control by the control device 7.

The transport mechanism 92 reciprocates the plurality of liquid discharge heads HU in a main scanning direction MH1 intersecting the sub scanning direction MP1 and in a main scanning direction MH2 opposite to the main scanning direction MH1 based on the control by the control device 7. The transport mechanism 92 includes a storage case 921 that accommodates the plurality of liquid discharge heads HU, and an endless belt 922 to which the storage case 921 is fixed. The storage device 3 may be accommodated in the storage case 921 together with the liquid discharge head HU.

The control device 7 supplies, with respect to the liquid discharge head HU, a drive signal Com for driving the liquid discharge head HU and a control signal SI for controlling the liquid discharge head HU. Then, the liquid discharge head HU is driven by the drive signal Com based on the control of the control signal SI to discharge the ink IK from some or all of a plurality of nozzles provided in the liquid discharge head HU. That is, the liquid discharge head HU causes the ink IK to be discharged from some or all of the plurality of nozzles in conjunction with the transportation of the medium PP by the movement mechanism 91 and the reciprocation of the liquid discharge head HU by the transport mechanism 92, and causes the discharged ink to land on a surface of the medium PP, thereby forming a desired image on the surface of the medium PP.

In the present embodiment, the liquid discharge head HU is an example of a "discharging section".

The ink supply device 1 of the storage devices 3 stores the ink IK. In addition, the ink supply device 1 supplies the ink IK stored in the ink supply device 1 to the liquid discharge head HU based on the control by the control device 7.

In the present embodiment, it is assumed that the ink supply device 1 stores M types of the ink IK. Here, a value M is a natural number that satisfies $1 \leq M$. More specifically, in the present embodiment, as an example, it is assumed that the ink supply device 1 stores four types of the ink IK corresponding to cyan, magenta, yellow, and black. That is, in the present embodiment, as an example, "M=4" is assumed. In addition, in the present embodiment, as an example, it is assumed that the ink jet printer 100 includes four liquid discharge heads HU corresponding to four types of the ink IK.

The ink amount detection device 2 of the storage devices 3 detects the remaining amount of the ink IK stored in the ink supply device 1 based on a detection signal Vout detected from the ink supply device 1. Then, the ink amount detection device 2 outputs ink amount information DR indicating a result of the detection. The detection signal Vout and the ink amount information DR will be described later.

A. 2. Overview of Ink Supply Device

In the following, an overview of the ink supply device 1 will be explained with reference to FIGS. 2 and 3.

Figure 2:
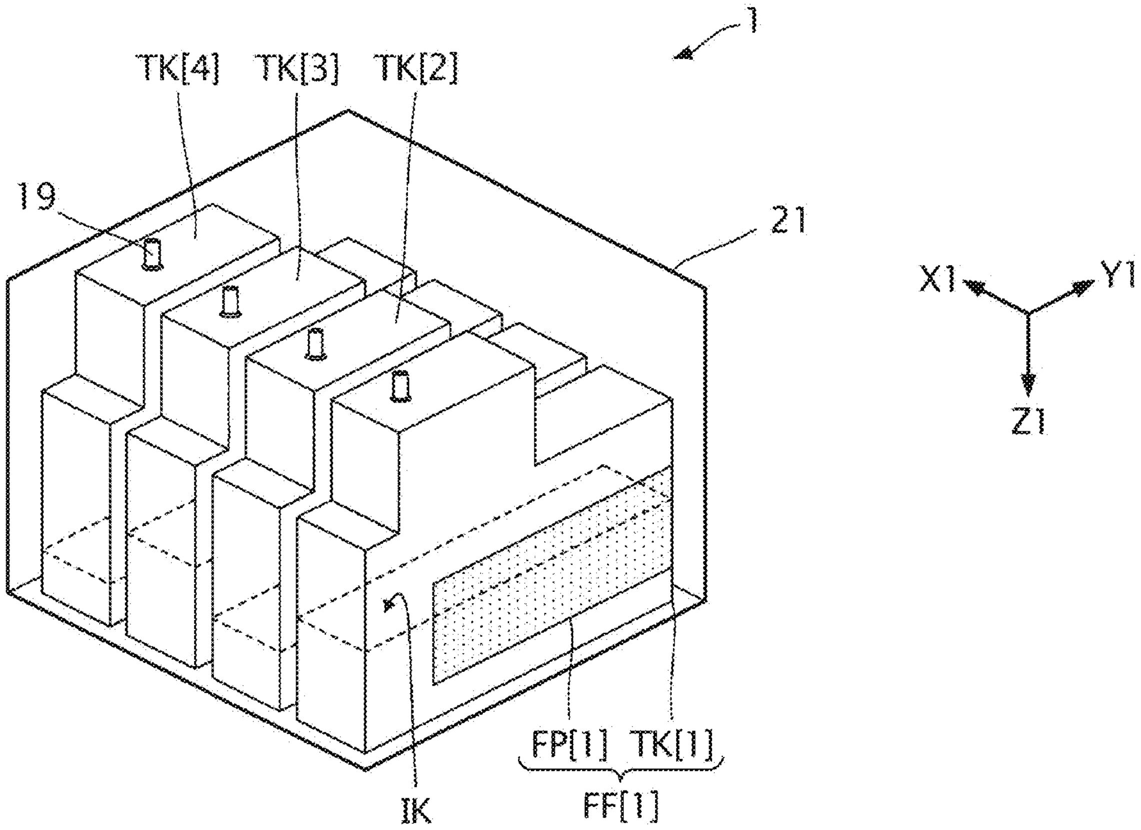
FIG. 2 is a perspective view showing an example of a configuration of an ink supply device.

FIG. 2 is an explanatory diagram for explaining a configuration of the ink supply device 1.

As shown in FIG. 2, the ink supply device 1 includes M ink tanks TK[1] to TK[M] corresponding one-to-one with M types of the ink IK stored in the ink supply device 1, M flexible printed substrates FP[1] to FP[M] corresponding one-to-one with the M ink tanks TK[1] to TK[M], and a storage case 21 that accommodates the M ink tanks TK[1] to TK[M] and M flexible printed substrates FP[1] to FP[M]. That is, in the present embodiment, the ink supply device 1 includes four ink tanks TK[1] to TK[4] corresponding one-to-one with four types of ink IK of cyan, magenta, yellow, and black, and four flexible printed substrates FP[1] to FP[4] corresponding one-to-one with the four ink tanks TK[1] to TK[4].

In an ink tank TK[m], a supply port 19 for supplying ink IK to an internal space of an ink tank TK[m] is provided. In addition, the flexible printed substrate FP[m] is fixed to the ink tank TK[m]. Here, the variable m is a natural number that satisfies $1 \leq m \leq M$. In the following, a component including the ink tank TK[m] and the flexible printed substrate FP[m] may be referred to as an ink management device FF[m]. That is, the ink supply device 1 includes M ink management devices FF[m] corresponding one-to-one with M types of ink IK stored in the ink supply device 1. In addition, in the following, the liquid discharge head HU that discharges the ink IK supplied from the ink tank TK[m] provided in the ink management device FF[m] may be referred to as a liquid discharge head HU[m].

In the present embodiment, it is assumed that M ink tanks TK[1] to TK[M] are disposed to be aligned in an X1 direction along an X axis in the ink supply device 1.

In the following, the X1 direction and an X2 direction opposite to the X1 direction are collectively referred to as an X axis direction. In addition, in the following, a Y1 direction along a Y axis orthogonal to the X axis direction and a Y2 direction opposite to the Y1 direction are collectively referred to as a Y axis direction. In addition, in the following, a Z1 direction along a Z axis orthogonal to the X axis direction and the Y axis direction and a Z2 direction opposite to the Z1 direction are collectively referred to as a Z axis direction. In the present embodiment, it is assumed that the X axis, the Y axis, and the Z axis are orthogonal to each other. However, the present disclosure is not limited to such an aspect. The X axis, the Y axis, and the Z axis may intersect each other.

In addition, in the present embodiment, in a case where the ink IK is supplied from the ink tank TK[m] to the liquid discharge head HU[m] and the ink IK stored inside the ink tank TK[m] decreases, it is assumed that a direction in which the ink IK decreases is the Z1 direction.

In the present embodiment, the X1 direction is an example of a “first direction”, the Z1 direction is an example of a “second direction”, and the Y1 direction is an example of a “third direction”.

Figure 3:
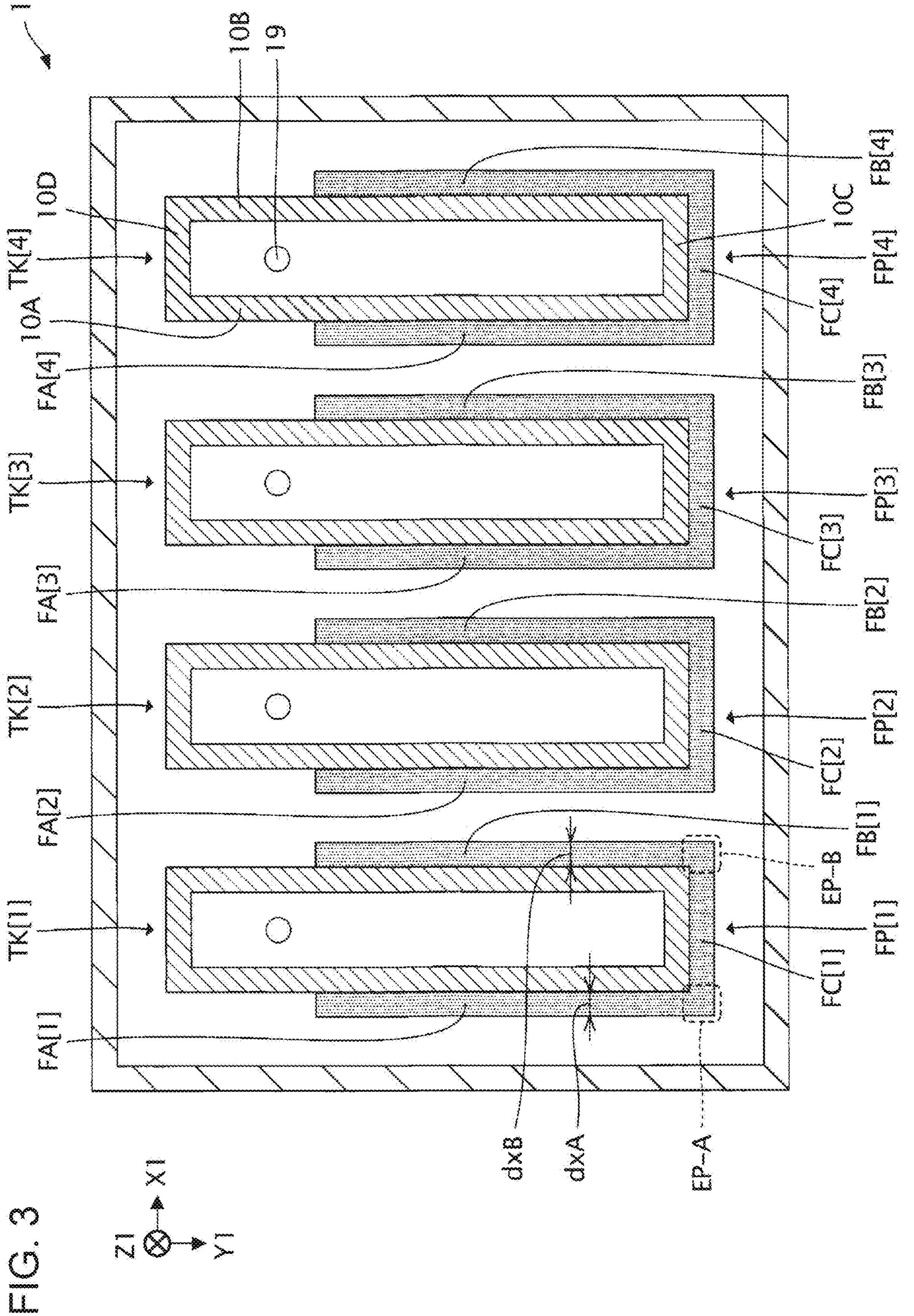
FIG. 3 is a cross-sectional view showing an example of a configuration of the ink supply device.

FIG. 3 is a plan view showing the configuration of the ink supply device 1 when the ink supply device 1 is viewed in the Z1 direction.

As shown in FIG. 3, in the present embodiment, it is assumed that an ink tank TK[2] is provided in the X1 direction when viewed from the ink tank TK[1], an ink tank TK[3] is provided in the X1 direction when viewed from the ink tank TK[2], and an ink tank TK[4] is provided in the X1 direction when viewed from the ink tank TK[3], in the ink supply device 1.

Figure 6:
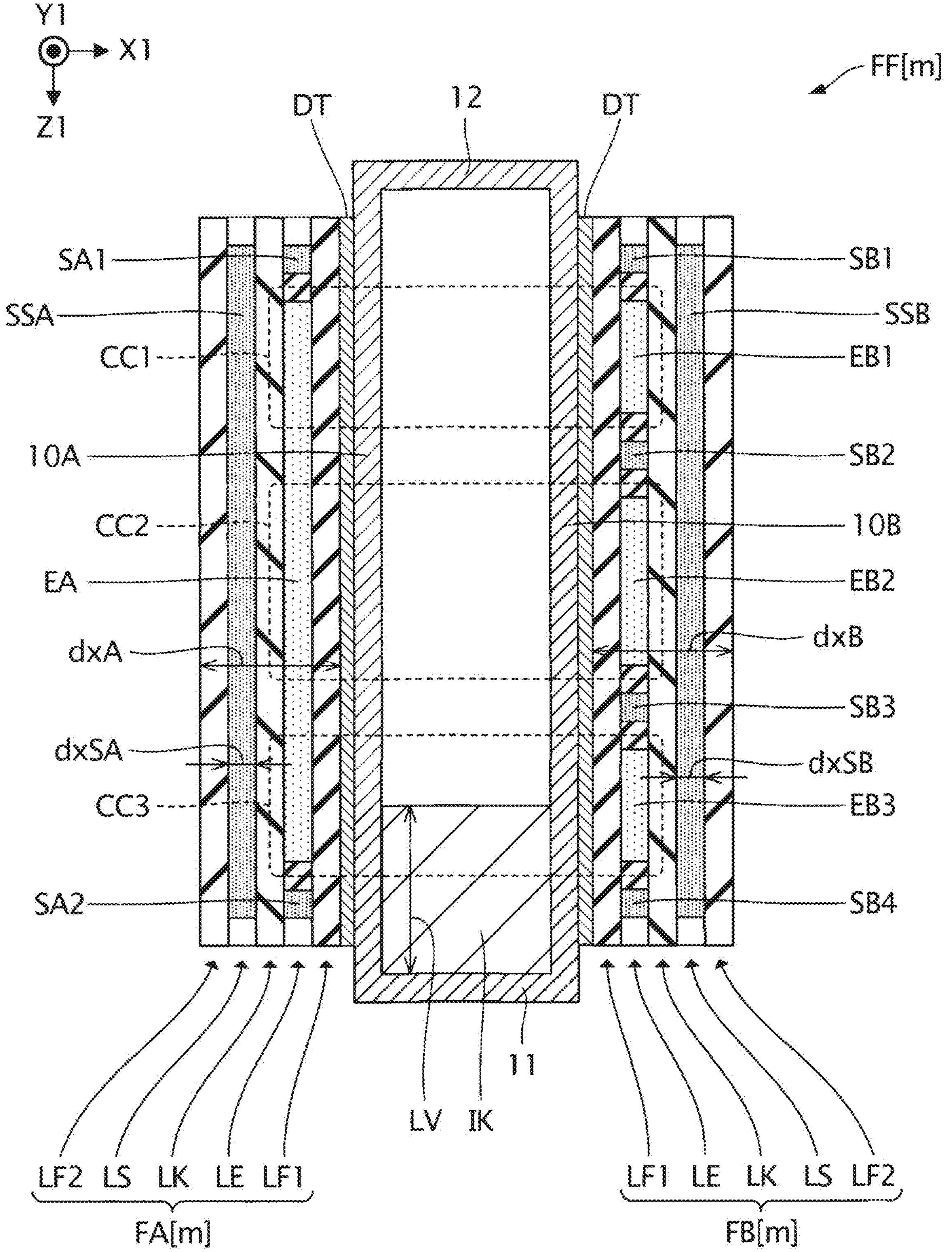
FIG. 6 is a cross-sectional view showing an example of a configuration of the ink management device.

In addition, in the present embodiment, it is assumed that the ink tank TK[m] is composed of a plurality of walls. In the following, it is assumed that the plurality of walls of the ink tank TK[m] have a wall 10A and wall 10B provided along a surface whose normal direction is the X1 direction, a wall 10C and a wall 10D provided along a surface whose normal direction is the Y1 direction, and a wall 11 and a wall 12 provided along a surface whose normal direction is the Z1 direction. The wall 11 and the wall 12 are shown in FIG. 6, which will be described later.

In addition, in the present embodiment, as described above, it is assumed that the flexible printed substrate FP[m] is attached to the ink tank TK[m]. Specifically, in the present embodiment, it is assumed that the flexible printed substrate FP[m] is fixed to the wall 10A, the wall 10C, and the wall 10B among the plurality of walls of the ink tank TK[m].

More specifically, in the present embodiment, the flexible printed substrate FP[m] is bent along outer wall surfaces of the wall 10A and the wall 10C in a bent portion EP-A, and is bent along outer wall surfaces of the wall 10B and the wall 10C in a bent portion EP-B. As a result, the flexible printed substrate FP[m] is provided to be in contact with an outer wall surface of the ink tank TK[m] in the wall 10A, an outer wall surface of the ink tank TK[m] in the wall 10B, and an outer wall surface of the ink tank TK[m] in the wall 10C.

In the following, a portion of the flexible printed substrate FP[m] provided on the wall 10A is referred to as a wiring portion FA[m], and a portion of the flexible printed substrate FP[m] provided on the wall 10B is referred to as a wiring portion FB[m], and a portion of the flexible printed substrate FP[m] provided on the wall 10C is referred to as a wiring portion FC[m]. In addition, in the following, a width of the wiring portion FA[m] in the X1 direction is referred to as a width dxA, and a width of the wiring portion FB[m] in the X1 direction is referred to as a width dxB.

In the present embodiment, the ink tank TK[m] is an example of a “storage section”, the outer wall surface of the ink tank TK[m] of the wall 10A is an example of a “first surface”, the outer wall surface of the ink tank TK[m] of the wall 10B is an example of a “second surface”, the wiring portion FA[m] is an example of a “first wiring portion”, and the wiring portion FB[m] is an example of a “second wiring portion”.

A. 3. Overview of Flexible Printed Substrate

In the following, an overview of the flexible printed substrate FP[m] will be explained with reference to FIGS. 4 to 7.

Figure 4:
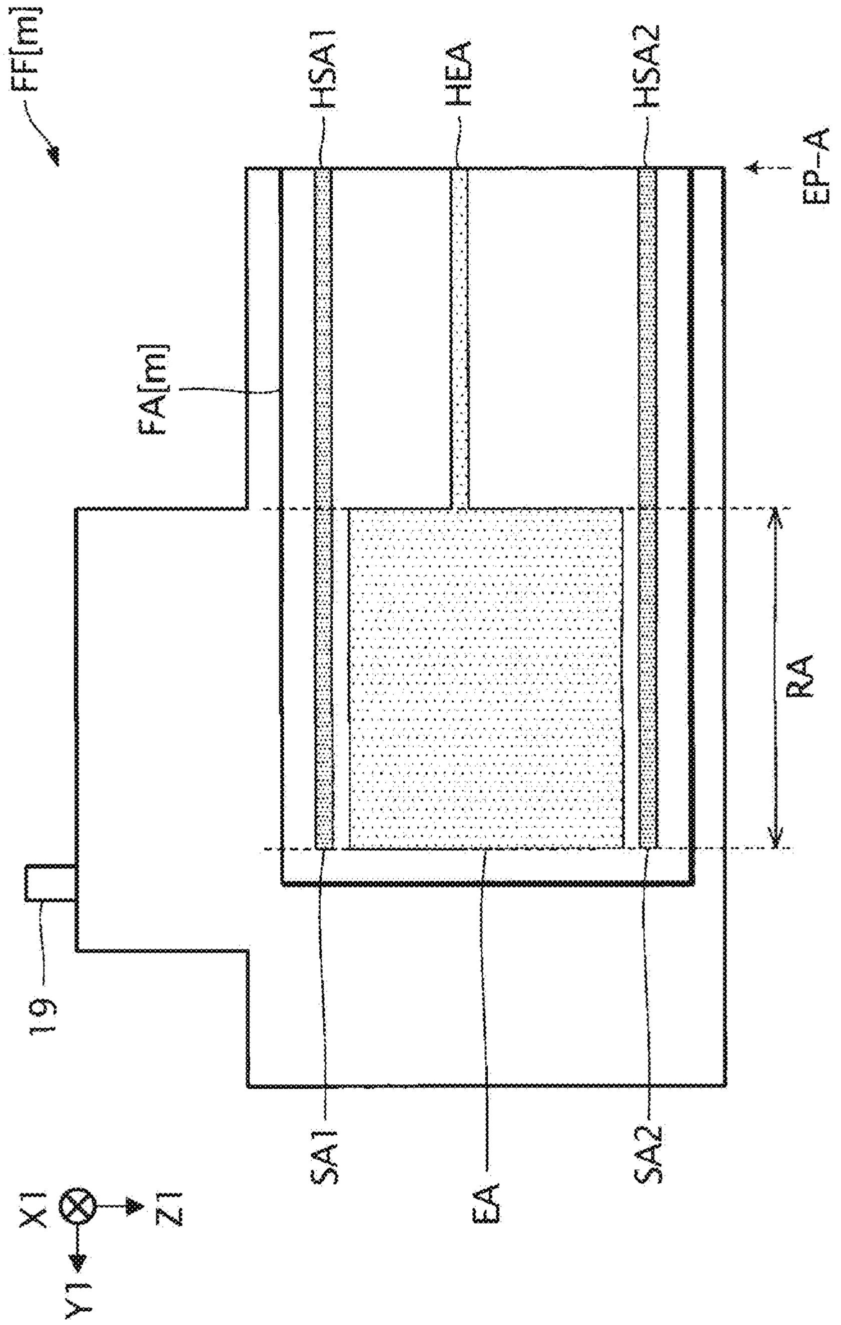
FIG. 4 is a plan view showing an example of a configuration of an ink management device.

FIG. 4 is a plan view of the wiring portion FA[m] observed when the ink management device FF[m] is viewed from the X2 direction to the X1 direction. In FIG. 4, only the main portion of the wiring portion FA[m] is transparently described.

As shown in FIG. 4, the wiring portion FA[m] includes a conductive input electrode EA provided in an electrode forming region RA, a conductive shield electrode SA1 provided at a position in the Z2 direction as viewed from the input electrode EA in the electrode forming region RA, and a conductive shield electrode SA2 provided at a position in the Z1 direction as viewed from the input electrode EA in the electrode forming region RA.

In addition, the wiring portion FA[m] includes a conductive coupling wiring HEA, which is provided between the electrode forming region RA and the bent portion EP-A and coupled to the input electrode EA, a conductive coupling wiring HSA1, which is provided between the electrode forming region RA and the bent portion EP-A at a position in the Z2 direction as viewed from the coupling wiring HEA and coupled to the shield electrode SA1, and a conductive coupling wiring HSA2, which is provided between the electrode forming region RA and the bent portion EP-A at a position in the Z1 direction as viewed from the coupling wiring HEA and coupled to the shield electrode SA2.

Figure 5:
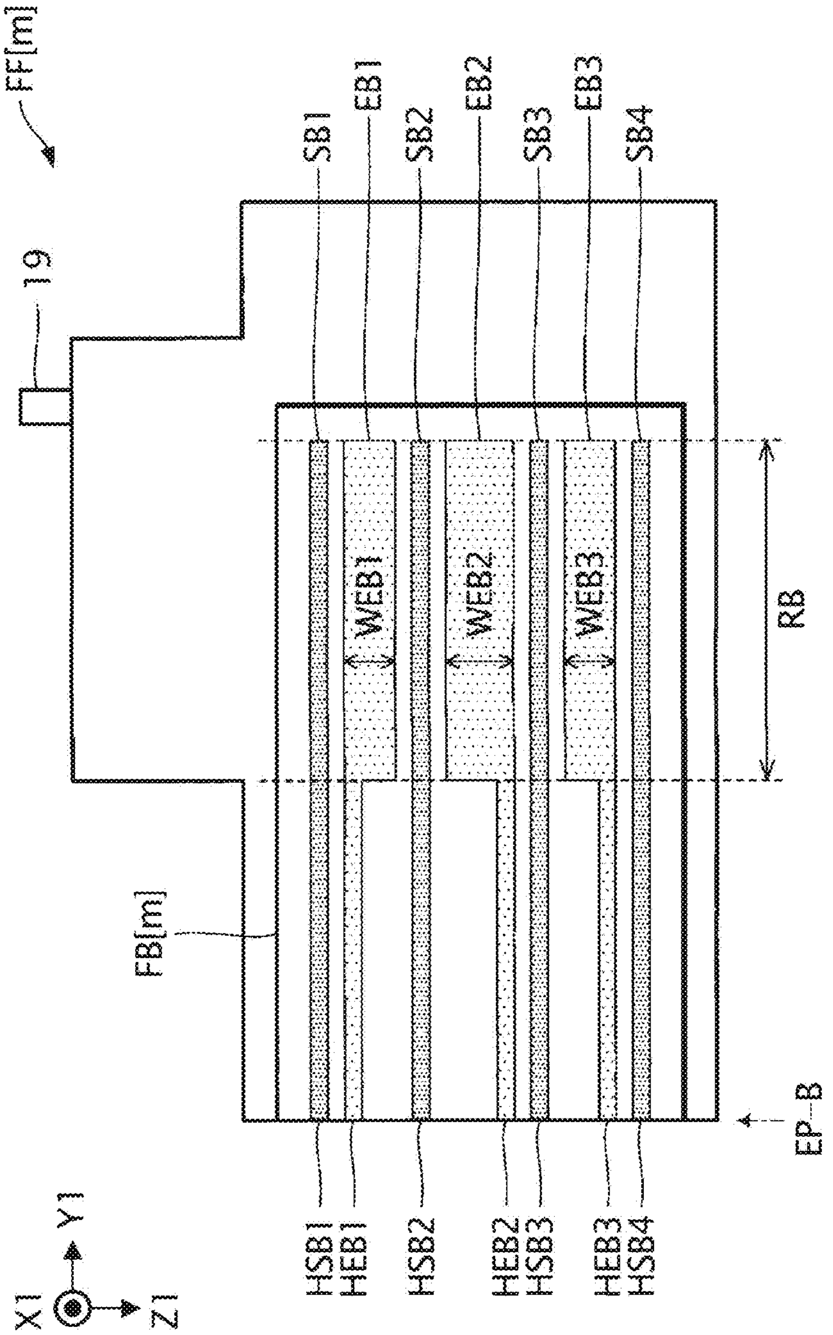
FIG. 5 is a plan view showing an example of a configuration of the ink management device.

FIG. 5 is a plan view of the wiring portion FB[m] observed when the ink management device FF[m] is viewed from the X1 direction to the X2 direction. In FIG. 5, only the main portion of the wiring portion FB[m] is transparently described.

As shown in FIG. 5, the wiring portion FB[m] includes a conductive detection electrode EB1 provided in the electrode forming region RB, a conductive detection electrode EB2 provided at a position in the Z1 direction as viewed from the detection electrode EB1 in the electrode forming region RB, a conductive detection electrode EB3 provided at a position in the Z1 direction as viewed from the detection electrode EB2 in the electrode forming region RB, a conductive shield electrode SB1 provided at a position in the Z2 direction as viewed from the detection electrode EB1 in the electrode forming region RB, a conductive shield electrode SB2 provided between the detection electrode EB1 and the detection electrode EB2 in the electrode forming region RB, a conductive shield electrode SB3 provided between the detection electrode EB2 and the detection electrode EB3 in the electrode forming region RB, and a conductive shield electrode SB4 provided at a position in the Z1 direction as viewed from the detection electrode EB3 in the electrode forming region RB.

In the present embodiment, the detection electrode EB1 is an example of a “first detection electrode”, the detection electrode EB2 is an example of a “second detection electrode”, and the detection electrode EB3 is an example of a “third detection electrode”.

In the following, a width of the detection electrode EB1 in the Z1 direction is referred to as a width WEB1, a width of the detection electrode EB2 in the Z1 direction is referred to as a width WEB2, and a width of the detection electrode EB3 in the Z1 direction is referred to as a width WEB3. In the present embodiment, the detection electrode EB1, the detection electrode EB2, and the detection electrode EB3 are provided so that “WEB1<WEB2” and “WEB3<WEB2” are satisfied.

In addition, the wiring portion FB[m] includes a conductive coupling wiring HEB1 that is provided between the electrode forming region RB and the bent portion EP-B and is coupled to the detection electrode EB1, a conductive coupling wiring HEB2 that is provided between the electrode forming region RB and the bent portion EP-B, is provided at a position of the Z1 direction as viewed from the coupling wiring HEB1, and is coupled to the detection electrode EB2, a conductive coupling wiring HEB3 that is provided between the electrode forming region RB and the bent portion EP-B, is provided at a position of the Z1 direction as viewed from the coupling wiring HEB2, and is coupled to the detection electrode EB3, a conductive coupling wiring HSB1 that is provided between the electrode forming region RB and the bent portion EP-B, is provided at a position of the Z2 direction as viewed from the coupling wiring HEB1, and is coupled to the shield electrode SB1, a conductive coupling wiring HSB2 that is provided between the electrode forming region RB and the bent portion EP-B, is provided between the coupling wiring HEB1 and coupling wiring HEB2, and is coupled to the shield electrode SB2, a conductive coupling wiring HSB3 that is provided between the electrode forming region RB and the bent portion EP-B, is provided between the coupling wiring HEB2 and the coupling wiring HEB3, and is coupled to the shield electrode SB3, and a conductive coupling wiring HSB4 that is provided between the electrode forming region RB and the bent portion EP-B, is provided at a position of the Z1 direction as viewed from the coupling wiring HEB3, and is coupled to the shield electrode SB4.

In the present embodiment, in a case where the ink management device FF[m] is viewed in the Y axis direction, a region where the electrode forming region RA and the wiring portion FB[m] overlap and the electrode forming region RB are substantially the same region. That is, in the present embodiment, when the ink management device FF[m] is viewed in the Y axis direction, the electrode forming region RA and the electrode forming region RB substantially coincide with each other. Here, “substantially the same” is a concept including not only a case of being completely the same but also a case of being considered to be the same in consideration of errors. In the present embodiment, “substantially the same” is a concept including a case of being considered to be the same when an error of about 10% is considered. “Substantially coincide” is the same as “substantially the same”.

FIG. 6 is a cross-sectional view of the ink management device FF[m] in a case where the ink management device FF[m] is cut by a plane having a normal vector oriented in the Y axis direction and passing through the electrode forming region RA and the electrode forming region RB.

As shown in FIG. 6, the flexible printed substrate FP[m] is fixed to the wall 10A, the wall 10B, and the wall 10C by a double-sided adhesive tape DT. The flexible printed substrate FP[m] includes a non-conductive cover film layer LF1 adhering to the double-sided adhesive tape DT, a non-conductive cover film layer LF2, a non-conductive base material layer LK that is provided between the cover film layer LF1 and the cover film layer LF2.

In addition, the flexible printed substrate FP[m] includes a wiring layer LE that is provided between the base material layer LK and the cover film layer LF1 and on which the input electrode EA, the detection electrode EB1, the detection electrode EB2, the detection electrode EB3, the shield electrode SA1, the shield electrode SA2, the shield electrode SB1, the shield electrode SB2, the shield electrode SB3, and the shield electrode SB4, which are described above, are disposed, and a shield layer LS that is provided between the base material layer LK and the cover film layer LF2 and on which the conductive shield electrode SSA and the conductive shield electrode SSB are disposed.

In the wiring layer LE, a non-conductive partition wall is provided between the input electrode EA and the shield electrode SA1, and between the input electrode EA and the shield electrode SA2. In addition, in the wiring layer LE, a non-conductive partition wall is provided between the detection electrode EB1 and the shield electrode SB1, between the detection electrode EB1 and the shield electrode SB2, between the detection electrode EB2 and the shield electrode SB2, between the detection electrode EB2 and the shield electrode SB3, between the detection electrode EB3 and the shield electrode SB3, and between the detection electrode EB3 and the shield electrode SB4.

In addition, the shield electrode SSA is provided so that the shield electrode SSA covers the entire input electrode EA in a case where the wiring portion FA[m] is viewed in the X1 direction. In addition, the shield electrode SSB is provided such that the shield electrode SSB covers all of the detection electrode EB1, the detection electrode EB2, and the detection electrode EB3 in a case where the wiring portion FB[m] is viewed in the X2 direction.

In the following, a width of the shield electrode SSA in the X1 direction is referred to as a width dxSA, and a width of the shield electrode SSB in the X1 direction is referred to as a width dxSB.

In the present embodiment, the shield electrode SSA and the shield electrode SSB are provided such that the width dxSA and the width dxSB are substantially the same. In addition, in the present embodiment, the wiring portion FA[m] and the wiring portion FB[m] are provided such that the width dxA and the width dxB are substantially the same.

As shown in FIG. 6, a capacitor CC1 is formed between the input electrode EA and the detection electrode EB1, a capacitor CC2 is formed between the input electrode EA and the detection electrode EB2, and a capacitor CC3 is formed between the input electrode EA and the detection electrode EB3. The capacitance values of the capacitor CC1, the capacitor CC2, and the capacitor CC3 are determined according to the remaining amount of the ink IK stored in the ink tank TK[m]. In the following, a distance from the wall 11, which is a bottom surface of the ink tank TK[m], to the liquid level of the ink IK stored in the ink tank TK[m] is referred to as a liquid level height LV.

Figure 7:
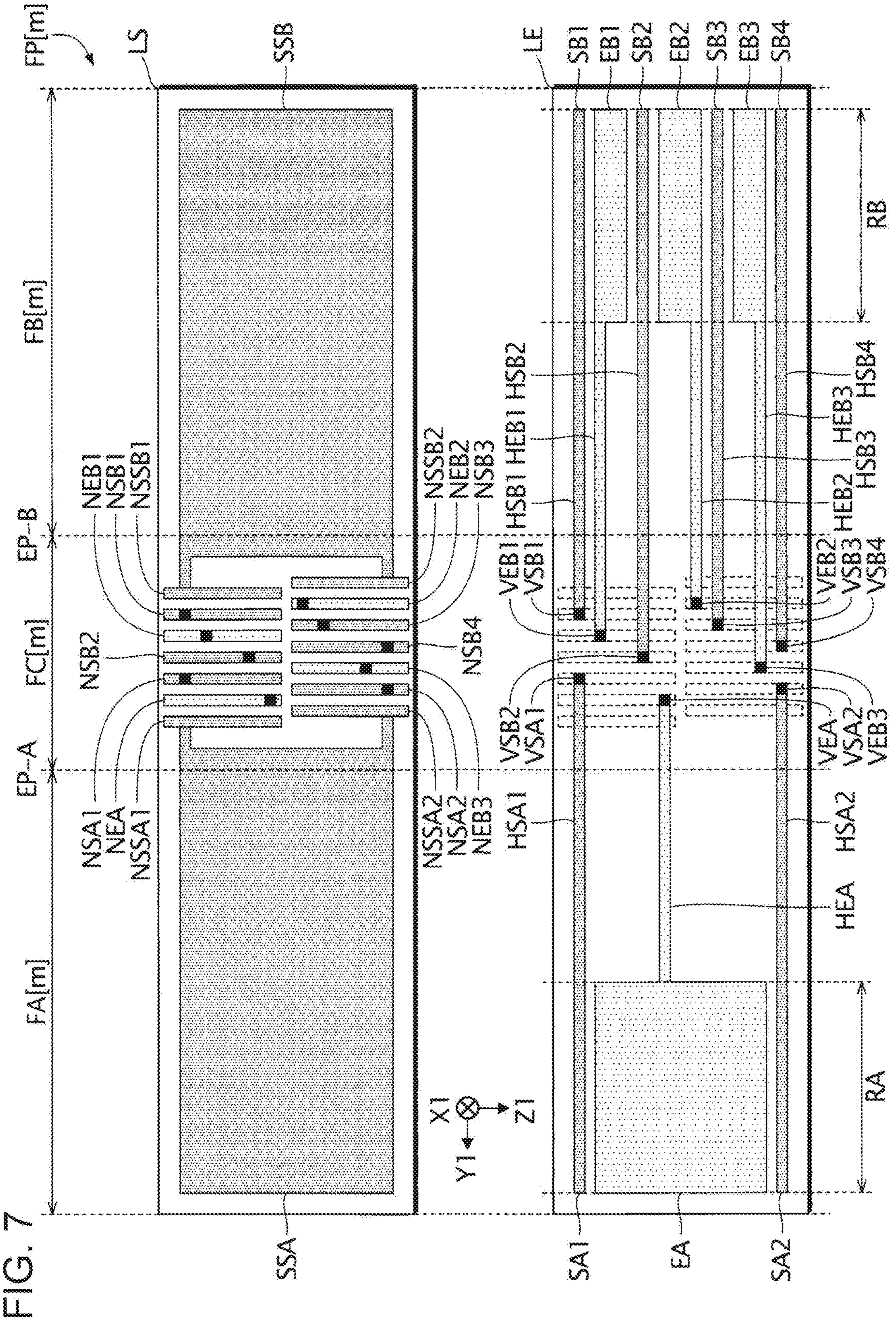
FIG. 7 is a plan view showing an example of a configuration of a flexible printed substrate.

FIG. 7 is a development view in a case where the flexible printed substrate FP[m] is removed from the ink tank TK[m] and developed in a plan shape. In FIG. 7, the X axis, the Y axis, and the Z axis are displayed assuming a case where the flexible printed substrate FP[m] is developed such that the wiring portion FC[m] and the wiring portion FB[m] are located on the same plane as the wiring portion FA[m]

without changing the position and the posture of the wiring portion FA[m] from the position and the posture in FIG. 4. In addition, in FIG. 7, in the flexible printed substrate FP[m], only the wiring layer LE and the shield layer LS are shown, and the base material layer LK, the cover film layer LF1, and the cover film layer LF2 are not shown.

As shown in FIG. 7, the wiring layer LE of the flexible printed substrate FP[m] includes a through electrode VEA, a through electrode VSAT, a through electrode VSA2, a through electrode VEB1, a through electrode VEB2, a through electrode VEB3, a through electrode VSB1, a through electrode VSB2, a through electrode VSB3, and a through electrode VSB4 in the wiring portion FC[m].

In the flexible printed substrate FP[m], the shield layer LS includes a terminal NEA, a terminal NSA1, a terminal NSA2, a terminal NEB1, a terminal NEB2, a terminal NEB3, a terminal NSB1, a terminal NSB2, a terminal NSB3, a terminal NSB4, a terminal NSSA1, a terminal NSSA2, a terminal NSSB1, and a terminal NSSB2.

Among these, the terminal NSSA1 and the terminal NSSA2 are coupled to the shield electrode SSA. The terminal NSSB1 and the terminal NSSB2 are coupled to the shield electrode SSB.

In addition, the through electrode VEA is coupled to the coupling wiring HEA and is coupled to the terminal NEA through a through hole provided in the base material layer LK. The through electrode VSAT is coupled to the coupling wiring HSA1 and is coupled to the terminal NSA1 through the through hole provided in the base material layer LK. The through electrode VSA2 is coupled to the coupling wiring HSA2 and is coupled to the terminal NSA2 through the through hole provided in the base material layer LK. The through electrode VEB1 is coupled to the coupling wiring HEB1 and is coupled to the terminal NEB1 through the through hole provided in the base material layer LK. The through electrode VEB2 is coupled to the coupling wiring HEB2 and is coupled to the terminal NEB2 through the through hole provided in the base material layer LK. The through electrode VEB3 is coupled to the coupling wiring HEB3 and is coupled to the terminal NEB3 through the through hole provided in the base material layer LK. The through electrode VSB1 is coupled to the coupling wiring HSB1 and is coupled to the terminal NSB1 through the through hole provided in the base material layer LK. The through electrode VSB2 is coupled to the coupling wiring HSB2 and is coupled to the terminal NSB2 through the through hole provided in the base material layer LK. The through electrode VSB3 is coupled to the coupling wiring HSB3 and is coupled to the terminal NSB3 through the through hole provided in the base material layer LK. The through electrode VSB4 is coupled to the coupling wiring HSB4 and is coupled to the terminal NSB4 through the through hole provided in the base material layer LK.

A. 4. Overview of Ink Amount Detection Device

In the following, an overview of the ink amount detection device 2 will be explained with reference to FIGS. 8 and 9.

Figure 8:
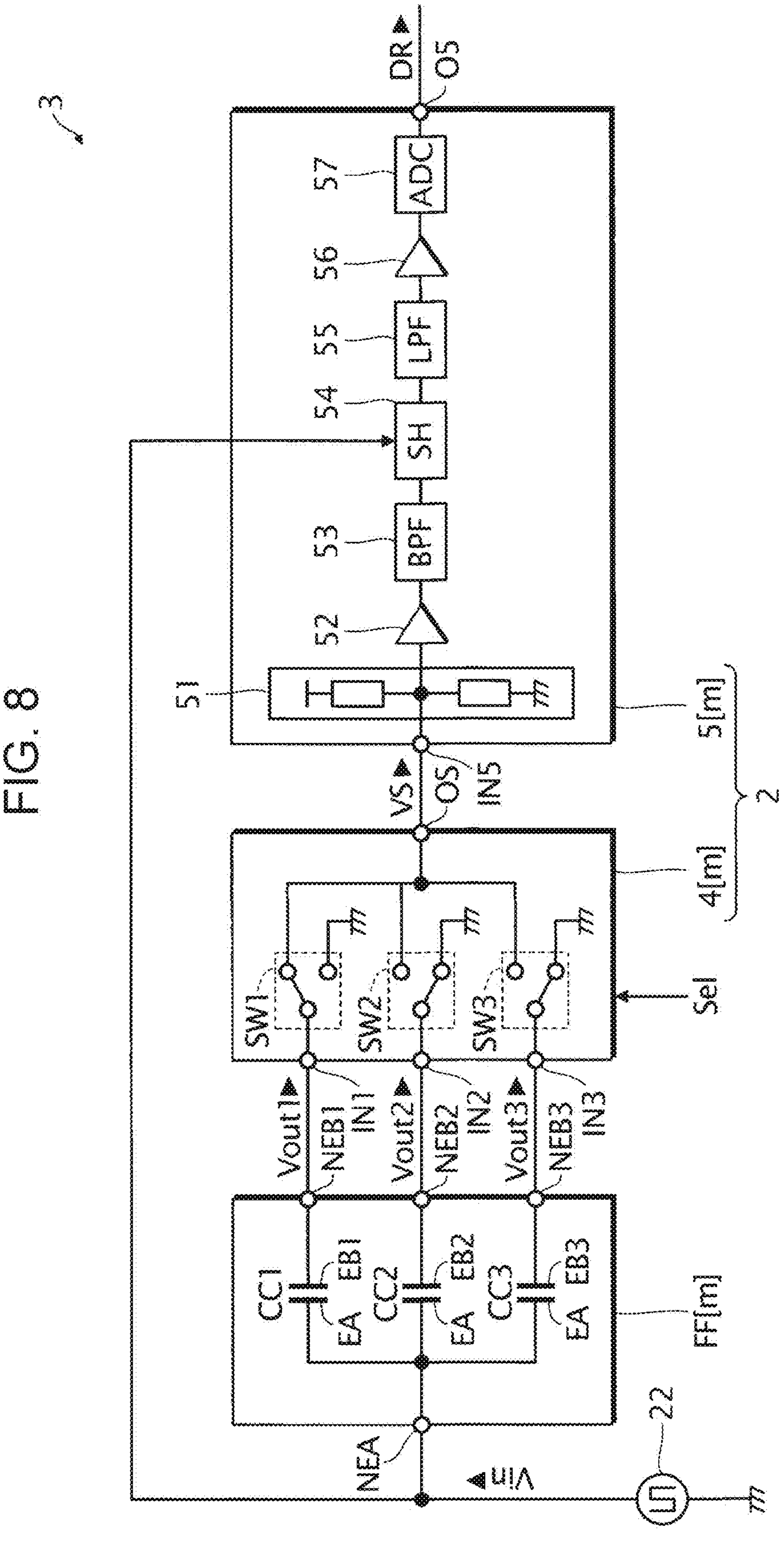
FIG. 8 is a block diagram showing an example of a configuration of a storage device.

FIG. 8 is a block diagram for explaining a configuration of the storage device 3 including the ink supply device 1 and the ink amount detection device 2.

As shown in FIG. 8, as described above, the storage device 3 includes the ink supply device 1 including the ink management device FF[m] and the ink amount detection device 2. The ink amount detection device 2 includes M selection circuits 4 corresponding one-to-one with M ink management devices FF[1] to FF[M] included in the ink supply device 1, and M ink amount information generation circuits 5 corresponding one-to-one with M ink management devices FF[1] to FF[M] included in the ink supply device 1. For convenience of explanation, FIG. 8 shows only one ink management device FF[m] among the M ink management devices FF[1] to FF[M] included in the ink supply device 1. In addition, for convenience of explanation, FIG. 8 shows a selection circuit 4[*m*] corresponding to the ink management device FF[m] and an ink amount information generation circuit 5[*m*] corresponding to the ink management device FF[m] among M selection circuits 4 and M ink amount information generation circuits 5 included in the ink amount detection device 2. In addition, for convenience of explanation, FIG. 8 shows the ink management device FF[m] as an equivalent circuit of the ink management device FF[m] using the capacitor CC1, the capacitor CC2, and the capacitor CC3 which are provided in the ink management device FF[m].

As shown in FIG. 8, the terminal NEA of the ink management device FF[m] is electrically coupled to an AC power supply 22. The AC power supply 22 supplies an input signal Vin, which is an AC pulse signal, to the terminal NEA. The input signal Vin input to the terminal NEA of the ink management device FF[m] is transmitted as a detection signal Vout1 to the terminal NEB1 through the capacitor CC1, is transmitted as a detection signal Vout2 to the terminal NEB2 through the capacitor CC2, and is transmitted as a detection signal Vout3 to the terminal NEB3 through the capacitor CC3. In the present embodiment, the detection signal Vout1, the detection signal Vout2, and the detection signal Vout3 are collectively referred to as a detection signal Vout in some cases.

The selection circuit 4[*m*] includes an input terminal IN1, an input terminal IN2, an input terminal IN3, an output terminal OS, a switch SW1, a switch SW2, and a switch SW3.

Among these, the input terminal IN1 is electrically coupled to the terminal NEB1. In a case where the AC power supply 22 supplies the input signal Vin to the terminal NEA, the detection signal Vout1 is supplied to the input terminal IN1 from the terminal NEB1. The input terminal IN2 is electrically coupled to the terminal NEB2. In a case where the AC power supply 22 supplies the input signal Vin to the terminal NEA, the detection signal Vout2 is supplied to the input terminal IN2 from the terminal NEB2. The input terminal IN3 is electrically coupled to the terminal NEB3. In a case where the AC power supply 22 supplies the input signal Vin to the terminal NEA, the detection signal Vout3 is supplied to the input terminal IN3 from the terminal NEB3.

In addition, the switch SW1 switches whether or not to electrically couple the input terminal IN1 and the output terminal OS based on a selection signal Se1 supplied from the control device 7. The switch SW2 switches whether or not to electrically couple the input terminal IN2 and the output terminal OS based on the selection signal Se1 supplied from the control device 7. The switch SW3 switches whether or not to electrically couple the input terminal IN3 and the output terminal OS based on the selection signal Se1 supplied from the control device 7.

More specifically, based on the selection signal Se1, the selection circuit 4[*m*] electrically couples one input terminal IN selected by the selection signal Se1 among the input terminal IN1, the input terminal IN2, and the input terminal IN3 to the output terminal OS, and grounds the input terminals IN unselected by the selection signal Se1 among the input terminal IN1, the input terminal IN2, and the input terminal IN3, that is, two input terminals IN other than the one input terminal IN, and electrically separates them from the output terminal OS. The selection circuit 4[*m*] outputs the detection signal Vout input to one input terminal IN selected by the selection signal Se1 from the output terminal OS as the output signal VS.

The ink amount information generation circuit 5[*m*] includes an input terminal IN5, an output terminal O5, a bias circuit 51, a buffer circuit 52, a band pass filter 53, a sample hold circuit 54, a low pass filter 55, an amplification circuit 56, and an analog-to-digital conversion circuit 57.

Among these, the input terminal IN5 is electrically coupled to the output terminal OS. In a case where the AC power supply 22 supplies the input signal Vin to the terminal NEA, the output signal VS is supplied to the input terminal IN5 from the output terminal OS. The input terminal IN5 is electrically coupled to the input terminal of the buffer circuit 52 through the bias circuit 51.

The bias circuit 51 biases the output signal VS supplied to the input terminal IN5 to a predetermined bias voltage between a power supply voltage and a ground voltage.

The buffer circuit 52 outputs the output signal VS, which is biased by the bias circuit 51, to the band pass filter 53.

The band pass filter 53 selectively passes components in a predetermined frequency range among the signals supplied from the buffer circuit 52, and removes other components.

The sample hold circuit 54 samples the signal output from the band pass filter 53 at a cycle based on the cycle of the input signal Vin supplied from the AC power supply 22, and holds the voltage value of the sampled signal until the operation of the analog-to-digital conversion circuit 57 ends. In addition, the sample hold circuit 54 outputs the sampled signal to the low pass filter 55.

The low pass filter 55 removes a frequency component greater than a predetermined threshold value from the signal input to the low pass filter 55, and causes the amplification circuit 56 to output frequency components equal to or less than the predetermined threshold value.

The amplification circuit 56 amplifies the signal supplied from the low pass filter 55 at a predetermined amplification factor, and outputs the amplified signal to the analog-to-digital conversion circuit 57.

The analog-to-digital conversion circuit 57 converts the analog signal output from the amplification circuit 56 into a digital signal. The analog-to-digital conversion circuit 57 outputs the digital signal to the control device 7. The signal supplied from the analog-to-digital conversion circuit 57 to the control device 7 is a signal representing ink amount information DR indicating a magnitude of the detection signal Vout selected as the output signal VS by the selection circuit 4[*m*]. Here, the magnitude of the detection signal Vout indicated by the ink amount information DR is, for example, an amplitude Aout of the detection signal Vout. However, the magnitude of the detection signal Vout indicated by the ink amount information DR may be the effective value of the detection signal Vout.

In the present embodiment, the ink amount information generation circuit 5[*m*] is an example of a "generation circuit".

Next, the amplitude Aout of the detection signal Vout indicated by the ink amount information DR will be explained with reference to FIG. 9.

Figure 9:
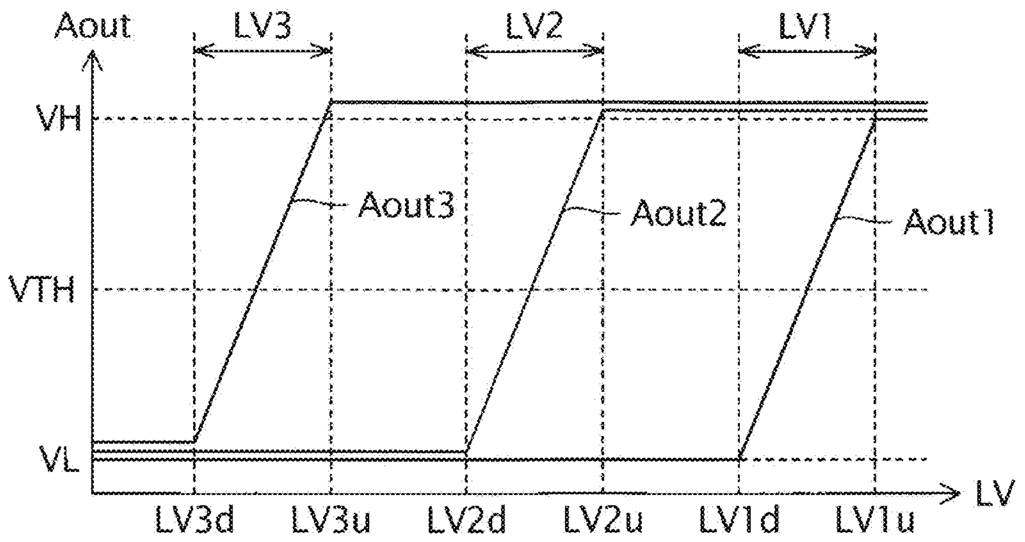
FIG. 9 is an explanatory diagram showing an example of a relationship between a liquid level height and an amplitude.

FIG. 9 is an explanatory diagram for explaining a relationship between the amplitude Aout of the detection signal Vout and the liquid level height LV.

In FIG. 9, the liquid level height LV1*d* is a height from the wall 11 to an end portion of the detection electrode EB1 in the Z1 direction. A liquid level height LV1*u* is a height from the wall 11 to the end portion of the detection electrode EB1 in the Z2 direction. That is, the liquid level range LV1 from the liquid level height LV1*d* to the liquid level height LV1*u* is a range of the liquid level height LV from a case where the ink IK is at a lower end of the detection electrode EB1 to a case where the ink IK is at an upper end of the detection electrode EB1 inside the ink tank TK[m].

In addition, in FIG. 9, a liquid level height LV2*d* is a height from the wall 11 to an end portion of the detection electrode EB2 in the Z1 direction. A liquid level height LV2*u* is a height from the wall 11 to an end portion of the detection electrode EB2 in the Z2 direction. That is, the liquid level range LV2 from the liquid level height LV2*d* to the liquid level height LV2*u* is a range of the liquid level height LV from a case where the ink IK is at a lower end of the detection electrode EB2 to a case where the ink IK is at an upper end of the detection electrode EB2 inside the ink tank TK[m].

In addition, in FIG. 9, a liquid level height LV3*d* is a height from the wall 11 to an end portion of the detection electrode EB3 in the Z1 direction. A liquid level height LV3*u* is a height from the wall 11 to the end portion of the detection electrode EB3 in the Z2 direction. That is, the liquid level range LV3 from the liquid level height LV3*d* to the liquid level height LV3*u* is a range of the liquid level height LV from a case where the ink IK is at a lower end of the detection electrode EB3 to a case where the ink IK is at an upper end of the detection electrode EB3 inside the ink tank TK[m].

In general, a relative permittivity of the ink IK is greater than a relative permittivity of the air. For this reason, in a case where a space corresponding to the liquid level range LV1 located between the input electrode EA and the detection electrode EB1 in the ink tank TK[m] is filled with ink IK, the electrostatic capacitance of the capacitor CC1 becomes large as compared with a case where the space is filled with the air. Similarly, in a case where a space corresponding to the liquid level range LV2 located between the input electrode EA and the detection electrode EB2 in the ink tank TK[m] is filled with ink IK, the electrostatic capacitance of the capacitor CC2 becomes large as compared with a case where the space is filled with the air. Similarly, in a case where a space corresponding to the liquid level range LV3 located between the input electrode EA and the detection electrode EB3 in the ink tank TK[m] is filled with ink IK, the electrostatic capacitance of the capacitor CC3 becomes large as compared with a case where the space is filled with the air.

In addition, in general, in a case where an area of the capacitor is large, the electrostatic capacitance of the capacitor becomes large as compared with a case where the area is small. Specifically, in a case where the area of the overlapping portion of the detection electrode EB1 and the input electrode EA is large when viewed in the X1 direction, the electrostatic capacitance of the capacitor CC1 becomes large as compared with a case where the area is small. In addition, in a case where the area of the overlapping portion of the detection electrode EB2 and the input electrode EA is large when viewed in the X1 direction, the electrostatic capacitance of the capacitor CC2 becomes large as compared with a case where the area is small. In addition, in a case where the area of the overlapping portion of the detection electrode EB3 and the input electrode EA is large when viewed in the X1 direction, the electrostatic capacitance of the capacitor CC3 becomes large as compared with a case where the area is small.

In the present embodiment, as an example, it is assumed that the input electrode EA, the detection electrode EB1, the detection electrode EB2, and the detection electrode EB3 are provided such that the input electrode EA covers all of the detection electrode EB1, all of the detection electrode EB2, and all of the detection electrode EB3 when viewed in the X1 direction. For this reason, in the present embodiment, in a case where the area of the detection electrode EB1 is large, the electrostatic capacitance of the capacitor CC1 becomes large as compared with a case where the area is small. In addition, in the present embodiment, in a case where the area of the detection electrode EB2 is large, the electrostatic capacitance of the capacitor CC2 becomes large as compared with a case where the area is small. In addition, in the present embodiment, in a case where the area of the detection electrode EB3 is large, the electrostatic capacitance of the capacitor CC3 becomes large as compared with a case where the area is small.

In a case where the electrostatic capacitance of the capacitor CC1 is large, an amplitude Aout1 of the detection signal Vout1 becomes large as compared with a case where the electrostatic capacitance of the capacitor CC1 is small. Similarly, in a case where the electrostatic capacitance of the capacitor CC2 is large, an amplitude Aout2 of the detection signal Vout2 becomes large as compared with a case where the electrostatic capacitance of the capacitor CC2 is small. Similarly, in a case where the electrostatic capacitance of the capacitor CC3 is large, an amplitude Aout3 of the detection signal Vout3 becomes large as compared with a case where the electrostatic capacitance of the capacitor CC3 is small.

For this reason, as shown in FIG. 9, in a case where the liquid level height LV is equal to or greater than the liquid level height LV1*u*, the amplitude Aout1 of the detection signal Vout1 becomes large as compared with a case where the liquid level height LV is equal to or less than the liquid level height LV1*d*. In addition, in a case where the liquid level height LV is equal to or greater than the liquid level height LV2*u*, the amplitude Aout2 of the detection signal Vout2 becomes large as compared with a case where the liquid level height LV is equal to or less than the liquid level height LV2*d*. In addition, in a case where the liquid level height LV is equal to or greater than the liquid level height LV3*u*, the amplitude Aout3 of the detection signal Vout3 becomes large as compared with a case where the liquid level height LV is equal to or less than the liquid level height LV3*d*.

Specifically, in the present embodiment, the detection electrode EB1 is provided such that the amplitude Aout1 of the detection signal Vout1 is a voltage VH in a case where the liquid level height LV is equal to or greater than the liquid level height LV1*u*, and the amplitude Aout1 of the detection signal Vout1 is a voltage VL smaller than the voltage VH in a case where the liquid level height LV is equal to or less than the liquid level height LV1*d*. In addition, in the present embodiment, the detection electrode EB2 is provided such that the amplitude Aout2 of the detection signal Vout2 is a voltage VH in a case where the liquid level height LV is equal to or greater than the liquid level height LV2*u*, and the amplitude Aout2 of the detection signal Vout2 is the voltage VL in a case where the liquid level height LV is equal to or less than the liquid level height LV2*d*. In addition, in the present embodiment, the detection electrode EB3 is provided such that the amplitude Aout3 of the detection signal Vout3 is a voltage VH in a case where the liquid level height LV is equal to or greater than the liquid level height LV3*u*, and the amplitude Aout3 of the detection signal Vout3 is a voltage VL in a case where the liquid level height LV is equal to or less than the liquid level height LV3*d*.

A threshold value voltage VTH shown in FIG. 9 is a voltage that is smaller than the voltage VH and larger than the voltage VL.

A. 5. Overview of Ink Remaining Amount Determination Process

In the following, an overview of an ink remaining amount determination process executed by the control device 7 will be explained with reference to FIG. 10. Here, the ink remaining amount determination process is a process of determining the remaining amount of the ink IK stored in the ink tank TK[m] based on the ink amount information DR.

Figure 10:
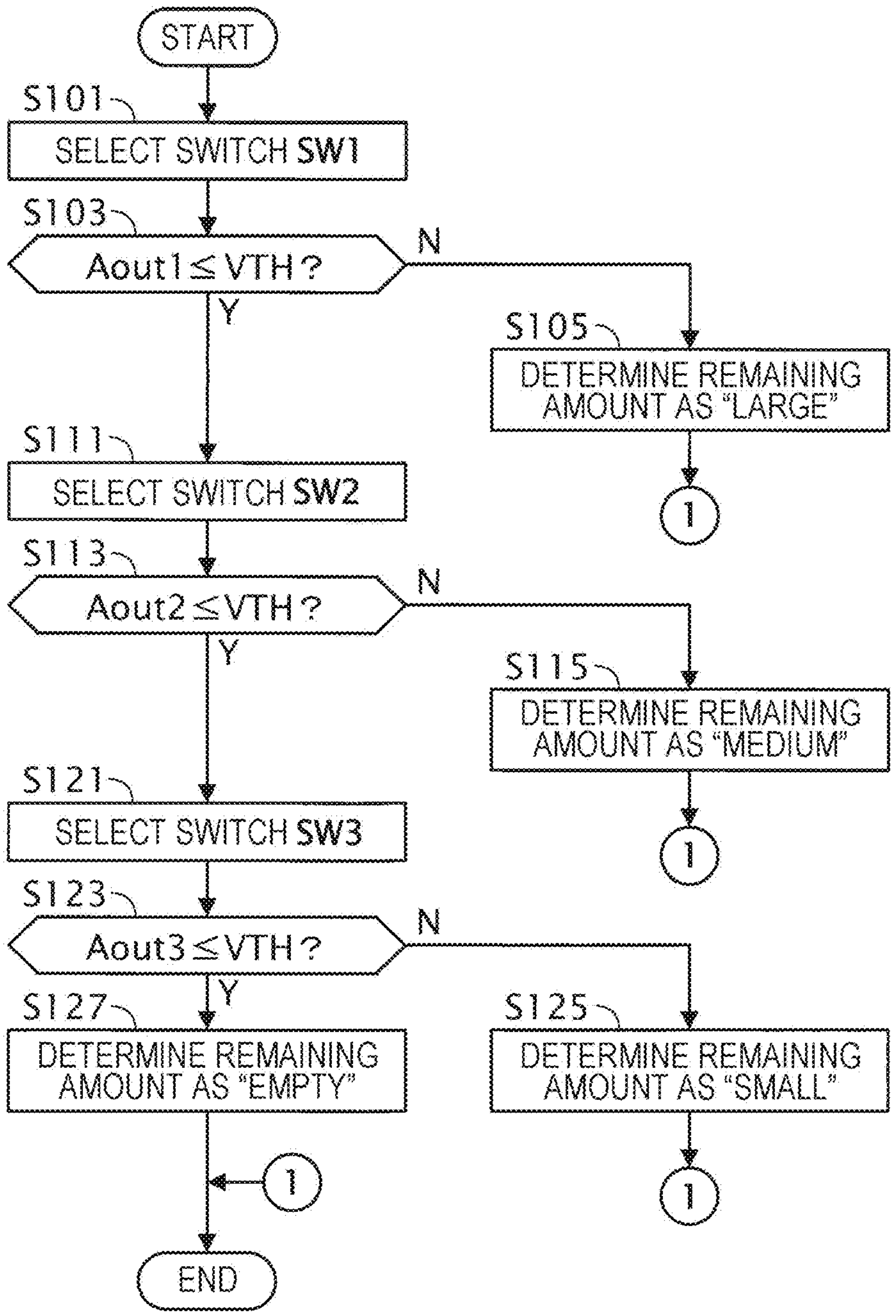
FIG. 10 is a flowchart showing an example of an ink remaining amount determination process.

As shown in FIG. 10, the control device 7 supplies the selection signal Se1 to select the switch SW1 corresponding to the detection electrode EB1 that outputs the detection signal Vout1 to the selection circuit 4[*m*] (S101). As a result, the control device 7 electrically couples the input terminal IN1 and the output terminal OS by the switch SW1, and causes the selection circuit 4[*m*] to output the detection signal Vout1 as the output signal VS.

Next, the control device 7 determines whether or not the amplitude Aout1 indicated by the ink amount information DR output by the ink amount information generation circuit 5[*m*] is equal to or less than the threshold value voltage VTH (S103).

In a case where a result of the determination in step S103 is negative, that is, in a case where the amplitude Aout1 indicated by the ink amount information DR is larger than the threshold value voltage VTH, the control device 7 determines that the remaining amount of the ink IK stored in the ink tank TK[m] is "large" (S105), and ends the ink remaining amount determination process shown in FIG. 10.

In addition, in a case where the result of the determination in step S103 is affirmative, that is, in a case where the amplitude Aout1 indicated by the ink amount information DR is equal to or less than the threshold value voltage VTH, the control device 7 supplies the selection signal Se1 to select the switch SW2 corresponding to the detection electrode EB2 that outputs the detection signal Vout2 to the selection circuit 4[*m*] (S111). As a result, the control device 7 electrically couples the input terminal IN2 and the output terminal OS by the switch SW2, and causes the selection circuit 4[*m*] to output the detection signal Vout2 as the output signal VS.

Next, the control device 7 determines whether or not the amplitude Aout2 indicated by the ink amount information DR output by the ink amount information generation circuit 5[*m*] is equal to or less than the threshold value voltage VTH (S113).

In a case where a result of the determination in step S113 is negative, that is, in a case where the amplitude Aout2 indicated by the ink amount information DR is larger than the threshold value voltage VTH, the control device 7 determines that the remaining amount of the ink IK stored in the ink tank TK[m] is "medium" (S115), and ends the ink remaining amount determination process shown in FIG. 10. In a case where the remaining amount of ink is "medium", the remaining amount of ink stored in the ink tank is smaller as compared with a case where the remaining amount of ink is "large".

In addition, in a case where the result of the determination in step S113 is affirmative, that is, in a case where the amplitude Aout2 indicated by the ink amount information DR is equal to or less than the threshold value voltage VTH, the control device 7 supplies the selection signal Se1 to select the switch SW3 corresponding to the detection electrode EB3 that outputs the detection signal Vout3 to the selection circuit 4[*m*] (S121). As a result, the control device 7 electrically couples the input terminal IN3 and the output terminal OS by the switch SW3, and causes the selection circuit 4[*m*] to output the detection signal Vout3 as the output signal VS.

Next, the control device 7 determines whether or not the amplitude Aout3 indicated by the ink amount information DR output by the ink amount information generation circuit 5[*m*] is equal to or less than the threshold value voltage VTH (S123).

In a case where a result of the determination in step S123 is negative, that is, in a case where the amplitude Aout3 indicated by the ink amount information DR is larger than the threshold value voltage VTH, the control device 7 determines that the remaining amount of the ink IK stored in the ink tank TK[m] is "small" (S125), and ends the ink remaining amount determination process shown in FIG. 10. In a case where the remaining amount of ink is "small", the remaining amount of ink stored in the ink tank is smaller as compared with a case where the remaining amount of ink is "medium".

In addition, in a case where the result of the determination in step S123 is affirmative, that is, in a case where the amplitude Aout3 indicated by the ink amount information DR is equal to or less than the threshold value voltage VTH, the control device 7 determines that the remaining amount of the ink IK stored in the ink tank TK[m] is "empty" (S127), and ends the ink remaining amount determination process shown in FIG. 10. In a case where the remaining amount of ink is "empty", the remaining amount of ink stored in the ink tank is smaller as compared with a case where the remaining amount of ink is "small".

In the present embodiment, the width WEB2 of the detection electrode EB2 in the Z1 direction is larger than the width WEB1 of the detection electrode EB1 in the Z1 direction and is larger than the width WEB3 of the detection electrode EB3 in the Z1 direction. In the following, in order to explain the effect of the present embodiment, an ink jet printer according to a comparative example will be explained. In the ink jet printer according to the comparative example, the configuration is the same as the ink jet printer 100 according to the present embodiment except that the width WEB2 of the detection electrode EB2 in the Z1 direction is substantially the same as the width WEB1 of the detection electrode EB1 in the Z1 direction, and the width WEB2 of the detection electrode EB2 in the Z1 direction is substantially the same as the width WEB3 of the detection electrode EB3 in the Z1 direction.

Figure 11:
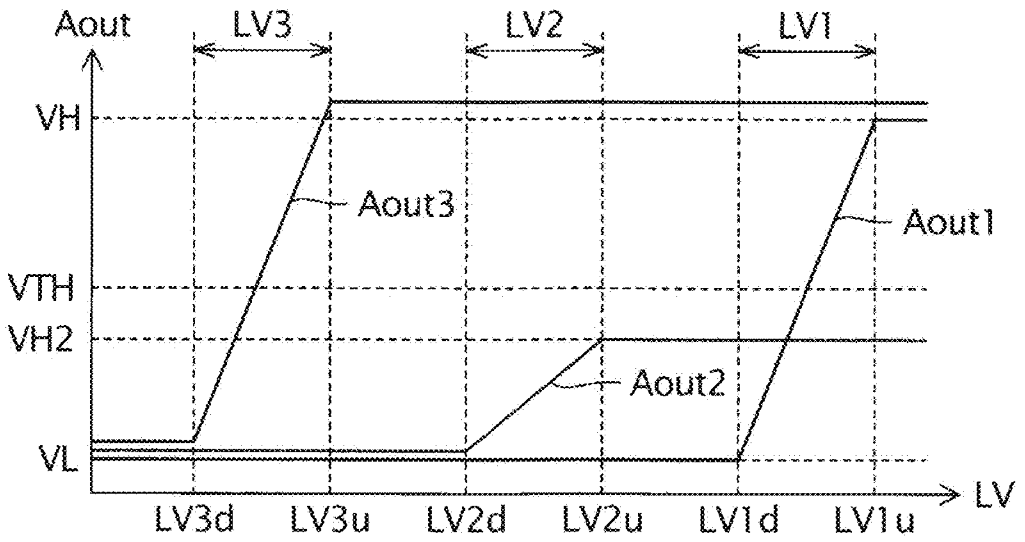
FIG. 11 is an explanatory diagram showing an example of a relationship between a liquid level height and an amplitude according to a comparative example.

FIG. 11 is an explanatory diagram for explaining a relationship between the amplitude Aout of the detection signal Vout and the liquid level height LV in the ink jet printer according to the comparative example.

As shown in FIG. 11, even in the comparative example as in the present embodiment, the detection electrode EB1 is provided such that the amplitude Aout1 of the detection signal Vout1 is the voltage VH in a case where the liquid level height LV is equal to or greater than the liquid level height LV1*u* and the amplitude Aout1 of the detection signal Vout1 is the voltage VL in a case where the liquid level height LV is equal to or less than the liquid level height LV1*d*, and the detection electrode EB3 is provided such that the amplitude Aout3 of the detection signal Vout3 is the voltage VH in a case where the liquid level height LV is equal to or greater than the liquid level height LV3*u* and the amplitude Aout3 of the detection signal Vout3 is the voltage VL in a case where the liquid level height LV is equal to or less than the liquid level height LV3*d*. On the other hand, in the comparative example, the amplitude Aout2 of the detection signal Vout2 is the voltage VL in a case where the liquid level height LV is equal to or less than the liquid level height LV2*d*. However, the amplitude Aout2 of the detection signal Vout2 is the voltage VH2 which is smaller than the voltage VH in a case where the liquid level height LV is equal to or greater than the liquid level height LV2*u*.

As described above, in the wiring portion FB[m], only one electrode of the shield electrode SB1 exists in the Z2 direction of the detection electrode EB1, and only one electrode of the shield electrode SB4 exists in the Z1 direction of the detection electrode EB3. On the other hand, in the wiring portion FB[m], three electrodes of the detection electrode EB1, the shield electrode SB1, and the shield electrode SB2 exist in the Z2 direction of the detection electrode EB2, and three electrodes of the detection electrode EB3, the shield electrode SB3, and the shield electrode SB4 exist in the Z1 direction of the detection electrode EB2. That is, it is conceivable that the magnitude of the influence of the electric field existing between the input electrode EA and the detection electrode EB2 on the electrodes other than the detection electrode EB2 in the wiring portion FB[m] is greater than the magnitude of the influence of the electric field existing between the input electrode EA and the detection electrode EB1 on the electrodes other than the detection electrode EB1 in the wiring portion FB[m], and is greater than the magnitude of the influence of the electric field existing between the input electrode EA and the detection electrode EB3 on the electrodes other than the detection electrode EB3 in the wiring portion FB[m].

For this reason, in a case where the width WEB2 of the detection electrode EB2 is substantially the same as the width WEB1 of the detection electrode EB1 and the width WEB2 of the detection electrode EB2 is substantially the same as the width WEB3 of the detection electrode EB3, as in the comparative example, as shown in FIG. 11, the amplitude Aout2 of the detection signal Vout2 output from the detection electrode EB2 is smaller than the amplitude Aout1 of the detection signal Vout1 output from the detection electrode EB1, and is smaller than the amplitude Aout3 of the detection signal Vout3 output from the detection electrode EB3. Therefore, in the comparative example, it becomes necessary for the control device 7 to prepare a determination threshold value for use in determining whether or not the remaining amount of the ink IK stored in the ink tank TK[m] is an amount equal to or greater than "medium" corresponding to the liquid level range LV2, separately from the threshold value voltage VTH used in determining whether or not the remaining amount of the ink IK stored in the ink tank TK[m] is an amount equal to or greater than "large" corresponding to the liquid level range LV1, and determining whether or not the remaining amount of the ink IK stored in the ink tank TK[m] is an amount equal to or greater than "small" corresponding to the liquid level range LV3.

On the other hand, in the present embodiment, as described above, the width WEB2 of the detection electrode EB2 is greater than the width WEB1 of the detection electrode EB1, and the width WEB2 of the detection electrode EB2 is greater than the width WEB3 of the detection electrode EB3. In other words, according to the present embodiment, the electrostatic capacitance of the capacitor CC2 can be made greater than the electrostatic capacitance of the capacitor CC1, and the electrostatic capacitance of the capacitor CC2 can be made greater than the electrostatic capacitance of the capacitor CC3. For this reason, according to the present embodiment, as shown in FIG. 9, the detection electrode EB1, the detection electrode EB2, and the detection electrode EB3 can be provided such that the amplitude Aout2 of the detection signal Vout2 output from the detection electrode EB2 is substantially the same as the amplitude Aout1 of the detection signal Vout1 output from the detection electrode EB1, and the amplitude Aout2 of the detection signal Vout2 output from the detection electrode EB2 is substantially the same as the amplitude Aout3 of the detection signal Vout3 output from the detection electrode EB3. Therefore, in the present embodiment, it becomes possible for the control device 7 to share a determination threshold value for use in determining whether or not the remaining amount of the ink IK stored in the ink tank TK[m] is an amount equal to or greater than "medium" corresponding to the liquid level range LV2 with the threshold value voltage VTH used in determining whether or not the remaining amount of the ink IK stored in the ink tank TK[m] is an amount equal to or greater than "large" corresponding to the liquid level range LV1, and determining whether or not the remaining amount of the ink IK stored in the ink tank TK[m] is an amount equal to or greater than "small" corresponding to the liquid level range LV3.

A. 6. Conclusion of First Embodiment

As explained above, the ink jet printer 100 according to the present embodiment includes the ink tank TK[m] that stores the ink IK between the wall 10A and the wall 10B located in the X1 direction as viewed from the wall 10A and facing the wall 10A, the liquid discharge head HU[m] that discharges the ink IK supplied from the ink tank TK[m], and the flexible printed substrate FP[m] for detecting the remaining amount of the ink IK in the ink tank TK[m], in which the flexible printed substrate FP[m] includes the wiring portion FA[m] having the input electrode EA provided on the wall 10A, and the wiring portion FB[m] having the detection electrode EB1 provided on the wall 10B, the detection electrode EB2 provided on the wall 10B, and the detection electrode EB3 provided on the wall 10B, the detection electrode EB2 is disposed between the detection electrode EB1 and the detection electrode EB3, and when the ink tank TK[m] is viewed in the X1 direction, the area of the region of the input electrode EA that overlaps the detection electrode EB1 is smaller than the area of the region of the input electrode EA that overlaps the detection electrode EB2, and the area of the region of the input electrode EA that overlaps the detection electrode EB3 is smaller than the area of the region of the input electrode EA that overlaps the detection electrode EB2.

In the present embodiment, the region of the input electrode EA that overlaps the detection electrode EB1 is an example of a "first region", the region of the input electrode EA that overlaps the detection electrode EB2 is an example of a "second region", and the region of the input electrode EA that overlaps the detection electrode EB3 is an example of a "third region".

In other words, in the present embodiment, the area of the region of the input electrode EA that overlaps the detection electrode EB2 is greater than the area of the region of the input electrode EA that overlaps the detection electrode EB1, and the area of the region of the input electrode EA that overlaps the detection electrode EB2 is greater than the area of the region of the input electrode EA that overlaps the detection electrode EB3. For this reason, according to the present embodiment, it is possible to make the amplitude of the signal detected from the detection electrode EB2 substantially the same as the amplitude of the signal detected from the detection electrode EB1 and the amplitude of the signal detected from the detection electrode EB3. In other words, according to the present embodiment, it is possible to make the signal level of the signal detected from the detection electrode EB2 substantially the same as the signal level of the signal detected from the detection electrode EB1 and the signal level of the signal detected from the detection electrode EB3. Accordingly, according to the present embodiment, the signal processing of the signals detected from the detection electrode EB1, the detection electrode EB2, and the detection electrode EB3 becomes easier as compared with an aspect in which the amplitude of the signal detected from the detection electrode EB2 is different from the amplitude of the signal detected from the detection electrode EB1 and the amplitude of the signal detected from the detection electrode EB3.

In addition, the ink jet printer 100 according to the present embodiment includes the ink amount information generation circuit 5[*m*] that generates the ink amount information DR related to the remaining amount of the ink IK stored in the ink tank TK[m], and the selection circuit 4[*m*] that selects one detection electrode EB from among the plurality of detection electrodes EB including the detection electrode EB1, the detection electrode EB2, and the detection electrode EB3 and included in the wiring portion FB[m] provided on the wall 10B, and electrically couples the selected one detection electrode EB to the ink amount information generation circuit 5[*m*], in which the ink amount information generation circuit 5[*m*] generates the ink amount information DR based on the detection signal Vout detected from the one detection electrode EB in a case where the input signal Vin is supplied to the input electrode EA.

In other words, according to the present embodiment, since the ink jet printer 100 includes the selection circuit 4[*m*], the ink amount information generation circuit 5[*m*] can receive the signals supplied from the detection electrode EB1, the detection electrode EB2, and the detection electrode EB3. Therefore, according to the present embodiment, the configuration of the ink jet printer 100 can be simplified as compared with an aspect in which a plurality of ink amount information generation circuits 5[*m*] corresponding one-to-one with the plurality of detection electrodes EB included in the wiring portion FB[m] are provided.

In addition, in the ink jet printer 100 according to the present embodiment, in a case where the selection circuit 4[*m*] selects one detection electrode EB from among the plurality of detection electrodes EB, the selection circuit 4[*m*] electrically separates the detection electrode EB other than the one detection electrode EB among the plurality of detection electrodes EB and the ink amount information generation circuit 5[*m*].

For this reason, according to the present embodiment, the ink amount information generation circuit 5[*m*] can receive signals supplied from the detection electrode EB1, the detection electrode EB2, and the detection electrode EB3.

In addition, in the ink jet printer 100 according to the present embodiment, the wiring portion FB[m] includes the shield electrode SB2 provided between the detection electrode EB1 and the detection electrode EB2 in the wall 10B, and the shield electrode SB3 provided between the detection electrode EB2 and the detection electrode EB3 in the wall 10B.

In the present embodiment, the shield electrode SB2 is an example of a "first shield electrode" and the shield electrode SB3 is an example of a "second shield electrode".

For this reason, according to the present embodiment, it is possible to suppress the superposition of the signal detected from one detection electrode EB among the detection electrode EB1, the detection electrode EB2, and the detection electrode EB3 as noise with a signal detected from the other detection electrodes EB.

In addition, in the ink jet printer 100 according to the present embodiment, on the wall 10B, the detection electrode EB1, the detection electrode EB2, and the detection electrode EB3 are disposed in the Z1 direction intersecting the X1 direction, and in the Z1 direction, the width WEB2 of the detection electrode EB2 is greater than the width WEB1 of the detection electrode EB1, and the width WEB2 of the detection electrode EB2 is greater than the width WEB3 of the detection electrode EB3.

For this reason, according to the present embodiment, it is possible to make the amplitude of the signal detected from the detection electrode EB2 substantially the same as the amplitude of the signal detected from the detection electrode EB1 and the amplitude of the signal detected from the detection electrode EB3.

In the present embodiment, an aspect in which three detection electrodes EB of the detection electrode EB1, the detection electrode EB2, and the detection electrode EB3 are provided on the wall 10B is exemplified and explained, but the present disclosure is not limited to such an aspect. For example, four or more detection electrodes EB may be provided on the wall 10B. In this case, the plurality of detection electrodes EB may be provided on the wall 10B such that the area of the detection electrode EB located at the central portion is greater than the area of the detection electrode EB located at the end portion.

In the following, among the plurality of detection electrodes EB provided on the wall 10B, the detection electrode EB located at the end portion in the Z1 direction is referred to as an end portion detection electrode EBT1, and the detection electrode EB located at an end portion in the Z2 direction is referred to as an end portion detection electrode EBT2. A distance between the detection electrode EB and the end portion detection electrode EBT1 in the Z1 direction is referred to as a distance dBT1, a distance between the detection electrode EB and the end portion detection electrode EBT2 in the Z1 direction is referred to as a distance dBT2, and the smaller distance between the distance dBT1 and the distance dBT2 is referred to as a distance dBT. In this case, for example, in a case where the distance dBT corresponding to one detection electrode EB among the plurality of detection electrodes EB provided on the wall 10B is greater than the distance dBT corresponding to the other detection electrode EB, the plurality of detection electrodes EB may be provided such that the area of the one detection electrode EB is greater than the area of the other detection electrode EB.

In other words, in the ink jet printer 100 according to the present embodiment, the wiring portion FB[m] may have the plurality of detection electrodes EB provided on the wall 10B and including the detection electrode EB1, the detection electrode EB2, and the detection electrode EB3, the area of one detection electrode EB among the plurality of detection electrodes EB may be greater than the area of the other detection electrode EB among the plurality of detection electrodes EB whose distance dBT from the detection electrode EB located at the end portion of the plurality of detection electrodes EB is closer than that of the one detection electrode EB.

According to this aspect, the variation in amplitude of the signal detected from the plurality of detection electrodes EB provided in the wiring portion FB[m] can be reduced.

In addition, in the present embodiment, a case in which the detection electrode EB1, the detection electrode EB2, and the detection electrode EB3 provided in the wiring portion FB[m] are disposed in the Z1 direction, and in the Z1 direction, the width WEB2 of the detection electrode EB2 is greater than the width WEB1 of the detection electrode EB1, and the width WEB2 of the detection electrode EB2 is greater than the width WEB3 of the detection electrode EB3 is exemplified and explained, but the present disclosure is not limited to such an aspect. For example, in the Y1 direction intersecting the Z1 direction, the detection electrode EB1, the detection electrode EB2, and the detection electrode EB3 may by provided such that the width of the detection electrode EB2 is greater than the width of the detection electrode EB1 and the width of the detection electrode EB2 is greater than the width of the detection electrode EB3.

In other words, in the ink jet printer 100 according to the present embodiment, on the wall 10B, the detection electrode EB1, the detection electrode EB2, and the detection electrode EB3 may be disposed in the Z1 direction, and in the Y1 direction intersecting the X1 direction and the Z1 direction, the width of the detection electrode EB2 may be greater than the width of the detection electrode EB1, and the width of the detection electrode EB2 may be greater than the width of the detection electrode EB3.

According to this aspect, it is possible to make the amplitude of the signal detected from the detection electrode EB2 substantially the same as the amplitude of the signal detected from the detection electrode EB1 and the amplitude of the signal detected from the detection electrode EB3.

B. Second Embodiment

In the following, an ink jet printer according to a second embodiment will be explained with reference to FIGS. 12 to 14. In each embodiment exemplified in the following, for elements whose actions and functions are similar to those of the first embodiment, the reference numerals used in the explanation of the first embodiment are used and detailed explanation of each is appropriately omitted.

B. 1. Ink Jet Printer According to Second Embodiment

The ink jet printer according to the second embodiment differs from the ink jet printer 100 according to the first embodiment in that an ink supply device 1W is provided instead of the ink supply device 1.

Figure 12:
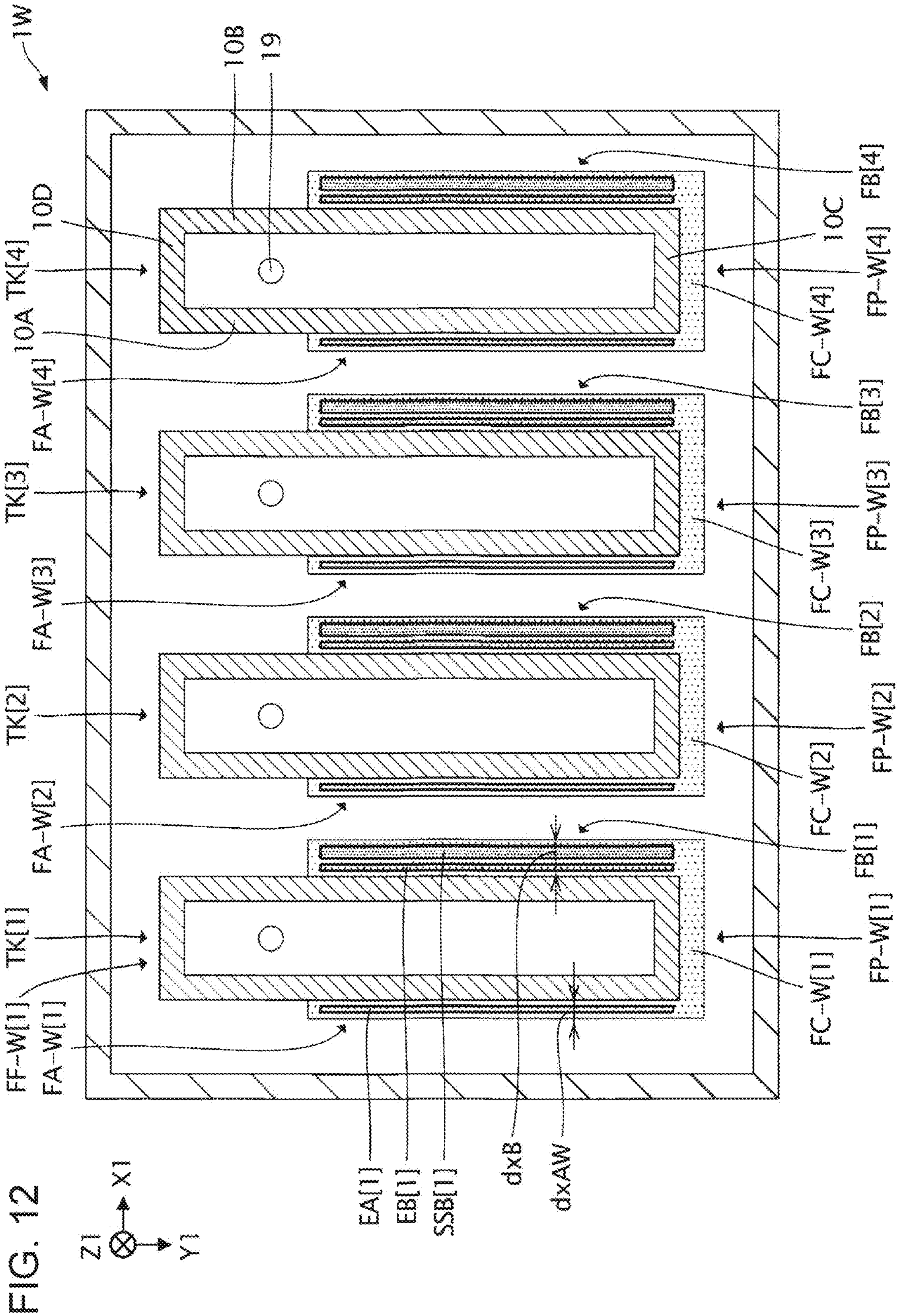
FIG. 12 is a cross-sectional view showing an example of a configuration of an ink supply device according to a second embodiment.

FIG. 12 is a plan view showing the configuration of the ink supply device 1W when the ink supply device 1 is viewed in the Z1 direction.

As shown in FIG. 12, the ink supply device 1W differs from the ink supply device 1 according to the first embodiment shown in FIG. 3 in that an ink management device FF-W[m] is provided instead of the ink management device FF[m].

The ink management device FF-W[m] differs from the ink management device FF[m] according to the first embodiment in that a flexible printed substrate FP-W[m] is provided instead of the flexible printed substrate FP[m].

The flexible printed substrate FP-W[m] differs from the flexible printed substrate FP[m] according to the first embodiment in that a wiring portion FA-W[m] is provided instead of the wiring portion FA[m], and a wiring portion FC-W[m] is provided instead of the wiring portion FC[m]. That is, the flexible printed substrate FP-W[m] according to the second embodiment includes the wiring portion FA-W [m], the wiring portion FB[m], and the wiring portion FC-W[m]. In the following, a width of the wiring portion FA-W[m] in the X1 direction is referred to as a width dxAW. Although details will be described later, the width dxAW is smaller than the width dxA. In addition, in the present embodiment, the width dxAW is smaller than the width dxB. In other words, in the present embodiment, the width dxAW of the wiring portion FA-W[m] in the X1 direction is smaller than the width dxB of the wiring portion FB[m] in the X1 direction.

Figure 13:
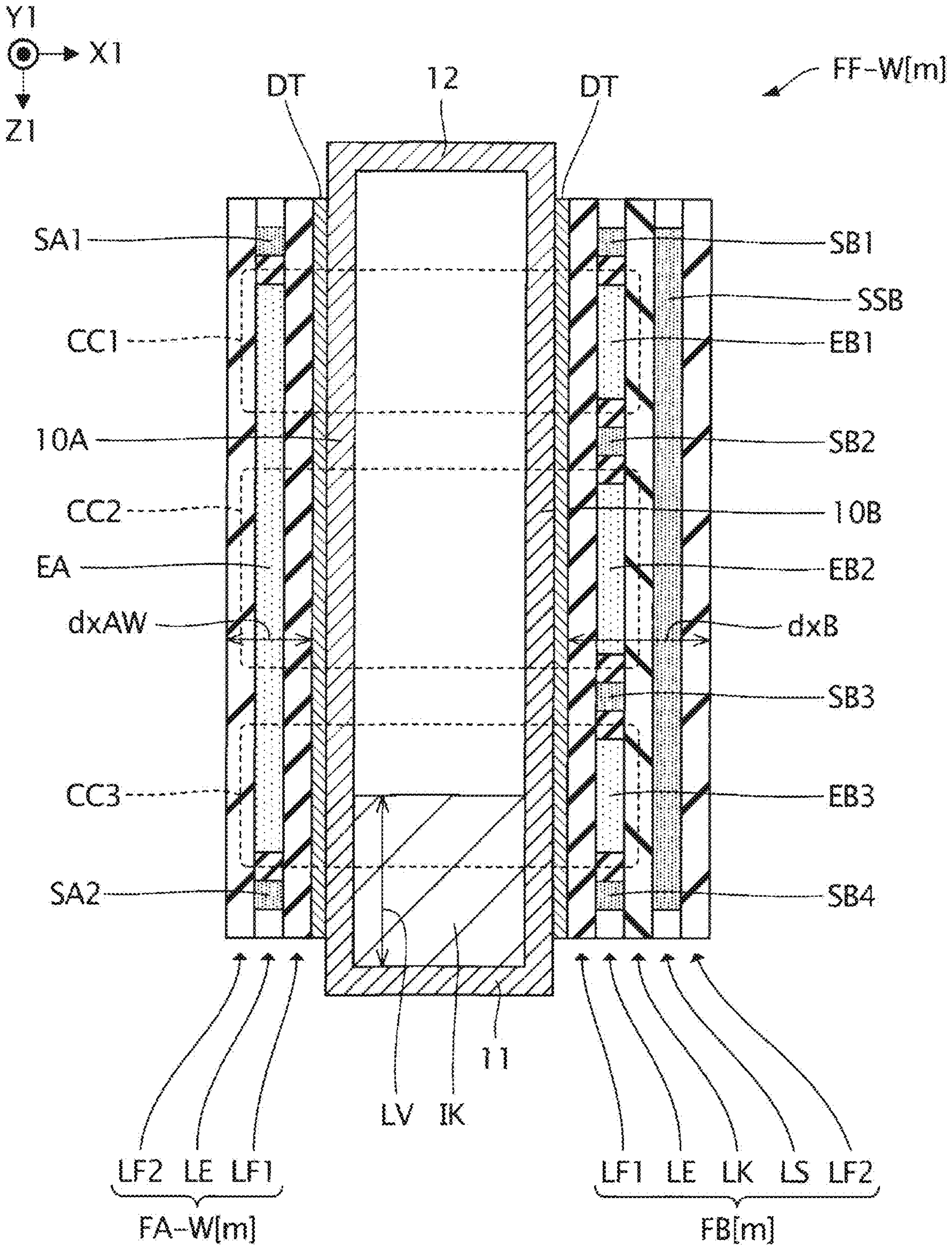
FIG. 13 is a cross-sectional view showing an example of a configuration of an ink management device according to the second embodiment.

FIG. 13 is a cross-sectional view of the ink management device FF-W[m] in a case where the ink management device FF-W[m] is cut by a plane having a normal vector oriented in the Y axis direction.

As shown in FIG. 13, the wiring portion FA-W[m] is the same the wiring portion FA[m] according to the first embodiment in that the cover film layer LF1, the cover film layer LF2, and the wiring layer LE provided between the cover film layer LF1 and the cover film layer LF2 are provided, but differs from the wiring portion FA[m] according to the first embodiment shown in FIG. 6 in that the base material layer LK and the shield layer LS are not provided between the cover film layer LF1 and the cover film layer LF2. In other words, the wiring portion FA-W[m] differs from the wiring portion FA[m] in that the shield layer LS including the shield electrode SSA is not provided.

The width dxAW of the wiring portion FA-W[m] in the X1 direction is determined based on a width of the cover film layer LF1 in the X1 direction, a width of the cover film layer LF2 in the X1 direction, and a width of the wiring layer LE in the X1 direction. On the other hand, the width dxB of the wiring portion FB[m] in the X1 direction is determined based on a width of the base material layer LK in the X1 direction and a width of the shield layer LS in the X1 direction in addition to the width of the cover film layer LF1 in the X1 direction, the width of the cover film layer LF2 in the X1 direction, and the width of the wiring layer LE in the X1 direction. For this reason, in the present embodiment, the width dxAW is smaller than the width dxB.

Figure 14:
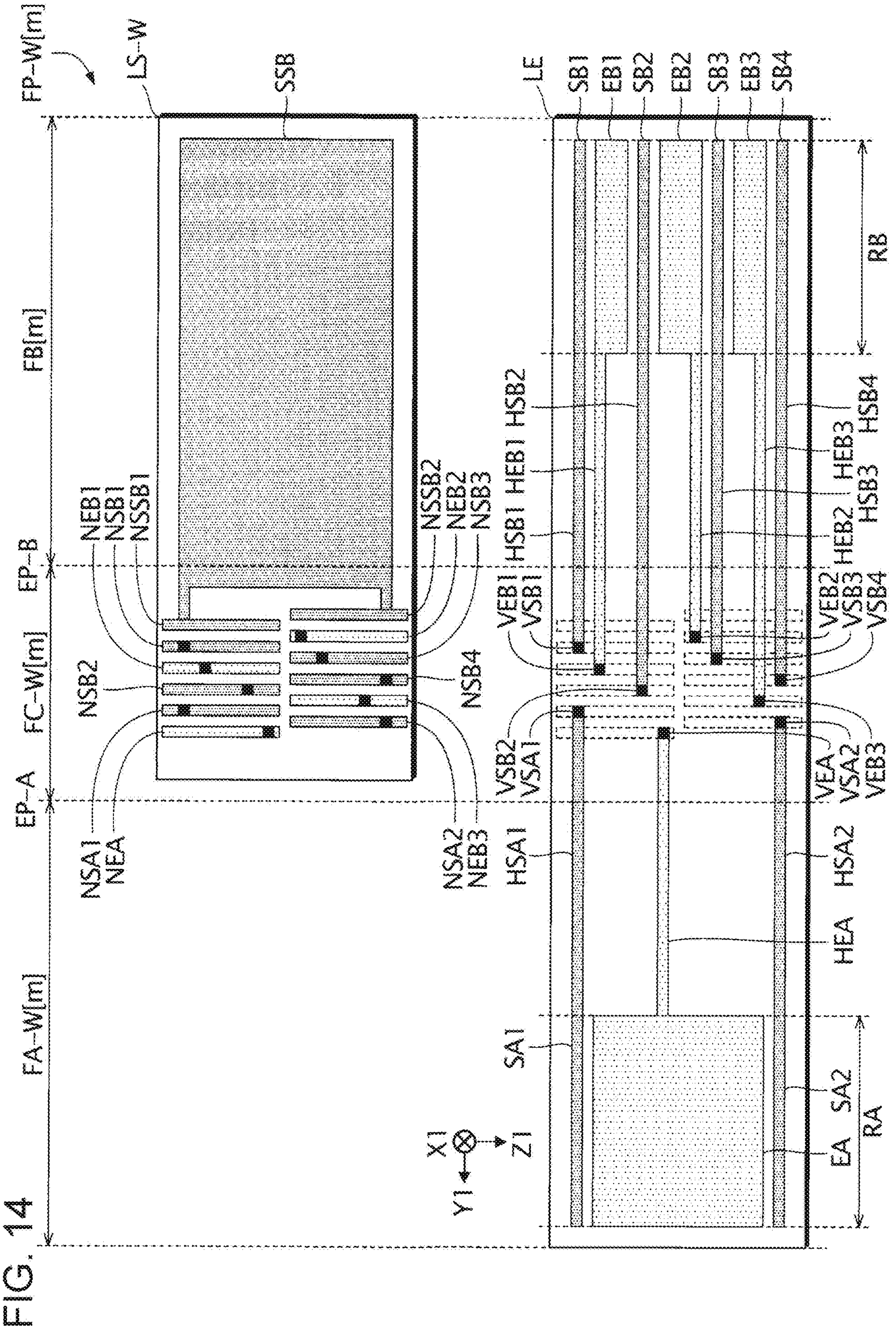
FIG. 14 is a plan view showing an example of a configuration of a flexible printed substrate according to the second embodiment.

FIG. 14 is a development view in a case where the flexible printed substrate FP-W[m] is removed from the ink tank TK[m] and developed in a plan shape.

As shown in FIG. 14, the flexible printed substrate FP-W[m] differs from the flexible printed substrate FP[m] according to the first embodiment shown in FIG. 7 in that a shield layer LS-W is provided instead of the shield layer LS. The shield layer LS-W is the same as the shield layer LS according to the first embodiment in that the shield electrode SSB is provided in a portion corresponding to the wiring portion FB[m]. However, the shield layer LS-W differs from the shield layer LS according to the first embodiment in that a portion corresponding to the wiring portion FA-W[m] is not provided, that is, the shield electrode SSA is not provided. In addition, the shield layer LS-W differs from the shield layer LS according to the first embodiment in a terminal coupled to the shield electrode SSA, such as the terminal NSSA1 and the terminal NSSA2, is not provided in the portion corresponding to the wiring portion FC-W[m].

In the present embodiment, the wall 10A provided in the ink tank TK[m] may be referred to as a wall 10A[m], and the wall 10B provided in the ink tank TK[m] may be referred to as a wall 10B[m] in some cases. In addition, in the present embodiment, the input electrode EA included in the wiring portion FA-W[m] is referred to as an input electrode EA[m], the detection electrode EB1, the detection electrode EB2, and the detection electrode EB3 included in the wiring portion FB[m] are referred to as a detection electrode EB[m], and the shield electrode SSB included in the wiring portion FB[m] may be referred to as a shield electrode SSB[m] in some cases.

B. 2. Conclusion of Second Embodiment

As explained above, the ink jet printer according to the second embodiment includes the ink tank TK[1] that stores the ink IK in the space between the wall 10A[1] and the wall 10B[1] facing the wall 10A[1], the ink tank TK[2] that stores the ink IK in the space between the wall 10A[2] and the wall 10B[2] facing the wall 10A[2], the liquid discharge head HU[1] that discharges the ink IK supplied from the ink tank TK[1], the liquid discharge head HU[2] that discharges the ink IK supplied from the ink tank TK[2], the flexible printed substrate FP-W[1] for detecting the remaining amount of the ink IK in the ink tank TK[1], and the flexible printed substrate FP-W[2] for detecting the remaining amount of the ink IK in the ink tank TK[2], in which the flexible printed substrate FP-W[1] includes the wiring portion FA-W[1] including the input electrode EA[1] provided on the wall 10A[1] and the wiring portion FB[1] including the detection electrode EB[1] provided on the wall 10B[1], the flexible printed substrate FP-W[2] includes the wiring portion FA-W [2] including the input electrode EA[2] provided on the wall 10A[2] and the wiring portion FB[2] including the detection electrode EB[2] provided on the wall 10B[2], the ink tank TK[1] and the ink tank TK[2] are disposed side by side such that the wall 10B[1] is located between the wall 10A[1] and the wall 10A[2], the wiring portion FB[1] has the shield electrode SSB[1] that is located between the detection electrode EB[1] and the wiring portion FA-W[2] for shielding the detection electrode EB[1], and the wiring portion FA-W[2] does not have the shield electrode SSA for shielding the input electrode EA[2] between the input electrode EA[2] and the wiring portion FB[1].

In the present embodiment, the surface of the wall 10A[1] is an example of a "first surface", the surface of the wall 10B[1] is an example of a "second surface", the surface of the wall 10A[2] is an example of a "third surface", the surface of the wall 10B[2] is an example of a "fourth surface", the ink tank TK[1] is an example of a "first storage section", the ink tank TK[2] is an example of a "second storage section", the liquid discharge head HU[1] is an example of a "first discharging section", the liquid discharge head HU[2] is an example of a "second discharging section", the flexible printed substrate FP-W[1] is an example of a "first flexible printed substrate", the flexible printed substrate FP-W[2] is an example of a "second flexible printed substrate", the input electrode EA[1] is an example of a "first electrode", the detection electrode EB[1] is an example of a "second electrode", the input electrode EA[2] is an example of a "third electrode", the detection electrode EB[2] is an example of a "fourth electrode", the shield electrode SSB[1] is an example of a "first shield electrode", the wiring portion FA-W[1] is an example of a "first wiring portion", the wiring portion FB[1] is an example of a "second wiring portion", and the wiring portion FA-W[2] is an example of a "third wiring portion", and the wiring portion FB[2] is an example of a "fourth wiring portion"

For this reason, according to the present embodiment, an interval between the ink tank TK[1] and the ink tank TK[2] can be narrowed in a case where the ink tank TK[1] and the ink tank TK[2] are disposed side by side as compared with an aspect in which the shield electrode SSA is provided in the wiring portion FA-W[2]. In other words, according to the present embodiment, the space for accommodating the ink tank TK[1] and the ink tank TK[2] can be made smaller in a case where the ink tank TK[1] and the ink tank TK[2] are disposed side by side, as compared with the aspect in which the shield electrode SSA is provided in the wiring portion FA-W[2].

In addition, the ink jet printer according to the second embodiment includes the ink tank TK[3] that stores the ink IK in the space between the wall 10A[3] and the wall 10B[3] facing the wall 10A[3], the liquid discharge head HU[3] that discharges the ink IK supplied from the ink tank TK[3], and the flexible printed substrate FP-W[3] for detecting the remaining amount of the ink IK in the ink tank TK[3], in which the flexible printed substrate FP-W[3] includes the wiring portion FA-W[3] including the input electrode EA[3] provided on the wall 10A[3] and the wiring portion FB[3] including the detection electrode EB[3] provided on the wall 10B[3], the ink tank TK[2] and the ink tank TK[3] are disposed side by side such that the wall 10B[2] is located between the walls 10A[2] and the wall 10A[3], the wiring portion FB[2] has the shield electrode SSB[2] that is located between the detection electrode EB[2] and the wiring portion FA-W[3] and that shields the detection electrode EB[2], and the wiring portion FA-W[3] does not have a shield electrode SSA that shields the input electrode EA[3] between the input electrode EA[3] and the wiring portion FB[2].

In the present embodiment, the surface of the wall 10A[3] is an example of a "fifth surface", the surface of the wall 10B[3] is an example of a "sixth surface", the ink tank TK[3] is an example of a "third storage section", the liquid discharge head HU[3] is an example of a "third discharging section", the flexible printed substrate FP-W[3] is an example of a "third flexible printed substrate", the input electrode EA[3] is an example of a "fifth electrode", the detection electrode EB[3] is an example of a "sixth electrode", the wiring portion FA-W[3] is an example of a "fifth wiring portion", and the wiring portion FB[3] is an example of a "sixth wiring portion".

For this reason, according to the present embodiment, an interval between the ink tank TK[2] and the ink tank TK[3] can be narrowed in a case where the ink tank TK[1], the ink tank TK[2], and the ink tank TK[3] are disposed side by side as compared with an aspect in which the shield electrode SSA is provided in the wiring portion FA-W[3]. In other words, according to the present embodiment, the space for accommodating the ink tank TK[1], the ink tank TK[2], and the ink tank TK[3] can be made smaller in a case where the ink tank TK[1], the ink tank TK[2], and the ink tank TK[3] are disposed side by side, as compared with the aspect in which the shield electrode SSA is provided in the wiring portion FA-W[3].

In addition, in the ink jet printer according to the second embodiment, the wiring portion FB[1] has an insulating base material layer LK between the detection electrode EB[1] and the shield electrode SSB[1], and the detection electrode EB[1] is provided between the wall 10B[1] and the base material layer LK.

For this reason, according to the present embodiment, it is possible to suppress deterioration of the detection electrode EB[1] due to contact of the ink IK, the outside air, or the like with the detection electrode EB[1].

In addition, the ink jet printer according to the second embodiment includes the ink amount detection device 2 that detects the remaining amount of the ink IK stored in the ink tank TK[1] based on the detection signal Vout1 detected from the detection electrode EB1 among the plurality of detection electrodes EB included in the detection electrode EB[1] in a case where the input signal Vin is supplied to the input electrode EA[1], and the detection signal Vout2 detected from the detection electrode EB2 provided in the Z1 direction of the detection electrode EB1 among the plurality of detection electrodes EB included in the detection electrode EB[1] in a case where the input signal Vin is supplied to the input electrode EA[1].

In the present embodiment, the detection electrode EB1 is an example of a "first detection electrode", the detection electrode EB2 is an example of a "second detection electrode", the detection signal Vout1 is an example of a "first detection signal", the detection signal Vout2 is an example of a "second detection signal", the Z1 direction is an example of a "first direction", and the ink amount detection device 2 is an example of a "detection section".

For this reason, according to the present embodiment, it is possible to grasp the remaining amount of the ink IK in the ink tank TK[1] step by step.

In addition, in the ink jet printer according to the second embodiment, the ink amount detection device 2 detects the remaining amount of the ink IK stored in the ink tank TK[1] based on the detection signal Vout3 detected from the detection electrode EB3 among the plurality of detection electrodes EB included in the detection electrode EB[1] in a case where the input signal Vin is supplied to the input electrode EA[1].

In the present embodiment, the detection electrode EB3 is an example of a "third detection electrode", and the detection signal Vout3 is an example of a "third detection signal".

For this reason, according to the present embodiment, it is possible to grasp the remaining amount of the ink IK in the ink tank TK[1] step by step.

In addition, in the ink jet printer according to the second embodiment, the input signal Vin is an AC signal.

In the above-described first embodiment and second embodiment, the AC input signal Vin is input to the input electrode EA[m]. For this reason, it is possible to generate the ink amount information DR that suppresses the variation of the dielectric constant depending on the type of the ink IK.

In the present embodiment, an aspect in which three detection electrodes EB of the detection electrode EB1, the detection electrode EB2, and the detection electrode EB3 are provided on the wall 10B is exemplified and explained, but the present disclosure is not limited to such an aspect. For example, the wall 10B may be provided with four or more detection electrodes EB, or provided with two detection electrodes EB.

In addition, in the present embodiment, a case in which the width WEB2 of the detection electrode EB2 in the Z1 direction is greater than the width WEB1 of the detection electrode EB1 in the Z1 direction and is greater than the width WEB3 of the detection electrode EB3 in the Z1 direction is exemplified and explained, but the present disclosure is not limited to such an aspect. In the present embodiment, the width WEB2 of the detection electrode EB2 in the Z1 direction may be substantially the same as the width WEB1 of the detection electrode EB1 in the Z1 direction, and the width WEB2 of the detection electrode EB2 in the Z1 direction may be substantially the same as the width WEB3 of the detection electrode EB3 in the Z1 direction.

C. Modification Example

Each of the above exemplified embodiments can be variously modified. Specific aspects of modification are exemplified in the following. Two or more aspects optionally selected from the following examples can be appropriately combined within a scope where the aspects do not conflict with each other.

Modification Example 1

In the above-described first embodiment and second embodiment, the ink IK, which is a "liquid", is exemplified and explained as an example of an object stored in the ink tank TK[m], but the present disclosure is not limited to such an aspect. The ink tank TK[m] may be capable of storing objects other than the ink IK. For example, the ink tank TK[m] may be capable of storing fluids such as oil, or may be capable of storing gel-like objects.

Modification Example 2

In the above-described embodiments and modification example 1, a case where the ink amount detection device 2 includes M selection circuits 4 and M ink amount information generation circuits 5 is exemplified and explained, but the present disclosure is not limited to such an aspect. The ink amount detection device 2 may be provided with one or more selection circuits 4 and one or more ink amount information generation circuits 5.

Modification Example 3

In the above-described embodiments and modification examples 1 and 2, a serial-type ink jet printer 100 in which the storage case 921 on which the liquid discharge head HU[m] is mounted is reciprocated in the X axis direction is exemplified, but the present disclosure is not limited to such an aspect. The ink jet printer 100 may be a line-type liquid discharge apparatus including the liquid discharge head HU[m] capable of discharging the ink IK over the entire width of the medium PP.

Modification Example 4

The liquid discharge apparatus explained by exemplifying the ink jet printer 100 in the above-described embodiments and modification examples 1 to 3 can be adopted in various apparatuses such as a facsimile machine and a copying machine in addition to an apparatus dedicated to printing. However, the application of the liquid discharge apparatus of the present disclosure is not limited to the printing. For example, a liquid discharge apparatus that discharges a solution of a coloring material is used as a manufacturing apparatus for forming a color filter of a liquid crystal display device. In addition, a liquid discharge apparatus that discharges a solution of a conductive material is used as a manufacturing apparatus for forming wiring and electrodes of a wiring substrate.

What is claimed is:

1. A storage device comprising:

a first storage section that stores an object in a space between a first surface and a second surface facing the first surface;

a second storage section that stores an object in a space between a third surface and a fourth surface facing the third surface;

a first flexible printed substrate for detecting a remaining amount of the object in the first storage section; and a second flexible printed substrate for detecting a remaining amount of the object in the second storage section, wherein the first flexible printed substrate includes a first wiring portion including a first electrode provided on the first surface, and a second wiring portion including a second electrode provided on the second surface, the second flexible printed substrate includes a third wiring portion including a third electrode provided on the third surface, and a fourth wiring portion including a fourth electrode provided on the fourth surface, the first storage section and the second storage section are disposed side by side such that the second surface is located between the first surface and the third surface, the second wiring portion has a first shield electrode that is located between the second electrode and the third wiring portion for shielding the second electrode, and the third wiring portion does not have a shield electrode for shielding the third electrode between the third electrode and the second wiring portion.

2. A liquid discharge apparatus comprising:

the storage device according to claim 1, the object being a liquid;

a first discharging section that discharges the liquid supplied from the first storage section; and a second discharging section that discharges the liquid supplied from the second storage section.

3. The liquid discharge apparatus according to claim 2, further comprising:

a third storage section that stores a liquid in a space between a fifth surface and a sixth surface facing the fifth surface;

a third discharging section that discharges the liquid supplied from the third storage section; and a third flexible printed substrate for detecting a remaining amount of the liquid in the third storage section, wherein the third flexible printed substrate includes a fifth wiring portion including a fifth electrode provided on the fifth surface, and a sixth wiring portion including a sixth electrode provided on the sixth surface, the second storage section and the third storage section are disposed side by side such that the fourth surface is located between the third surface and the fifth surface, the fourth wiring portion has a second shield electrode that is located between the fourth electrode and the fifth wiring portion for shielding the fourth electrode, and the fifth wiring portion does not have a shield electrode for shielding the fifth electrode between the fifth electrode and the fourth wiring portion.

4. The liquid discharge apparatus according to claim 2, wherein the second wiring portion has an insulating base material between the second electrode and the first shield electrode, and the second electrode is provided between the second surface and the base material.

5. The liquid discharge apparatus according to claim 2, further comprising:

a detection section that detects the remaining amount of the liquid stored in the first storage section based on a first detection signal detected from a first detection electrode among a plurality of detection electrodes included in the second electrode when an input signal is supplied to the first electrode, and a second detection signal detected from a second detection electrode provided in a first direction, which is a direction in which the liquid decreases in the first storage section as viewed from the first detection electrode among the plurality of detection electrodes when the input signal is supplied to the first electrode.

6. The liquid discharge apparatus according to claim 5, wherein the detection section detects the remaining amount of the liquid stored in the first storage section based on a third detection signal detected from a third detection electrode provided in the first direction as viewed from the second detection electrode among the plurality of detection electrodes when the input signal is supplied to the first electrode.

7. The liquid discharge apparatus according to claim 5, wherein the input signal is an AC signal.

8. The storage device according to claim 1, further comprising:

a third storage section that stores an object in a space between a fifth surface and a sixth surface facing the fifth surface; and a third flexible printed substrate for detecting a remaining amount of the object in the third storage section, wherein the third flexible printed substrate includes a fifth wiring portion including a fifth electrode provided on the fifth surface, and a sixth wiring portion including a sixth electrode provided on the sixth surface, the second storage section and the third storage section are disposed side by side such that the fourth surface is located between the third surface and the fifth surface, the fourth wiring portion has a second shield electrode that is located between the fourth electrode and the fifth wiring portion for shielding the fourth electrode, and the fifth wiring portion does not have a shield electrode for shielding the fifth electrode between the fifth electrode and the fourth wiring portion.

9. The storage device according to claim 1, wherein the second wiring portion has an insulating base material between the second electrode and the first shield electrode, and the second electrode is provided between the second surface and the base material.

10. The storage device according to claim 1, further comprising:

a detection section that detects the remaining amount of the object stored in the first storage section based on a first detection signal detected from a first detection electrode among a plurality of detection electrodes included in the second electrode when an input signal is supplied to the first electrode, and a second detection signal detected from a second detection electrode provided in a first direction, which is a direction in which the object decreases in the first storage section as viewed from the first detection electrode among the plurality of detection electrodes when the input signal is supplied to the first electrode.

11. The storage device according to claim 10, wherein the detection section detects the remaining amount of the object stored in the first storage section based on a third detection signal detected from a third detection electrode provided in the first direction as viewed from the second detection electrode among the plurality of detection electrodes when the input signal is supplied to the first electrode.

12. The storage device according to claim 10, wherein the input signal is an AC signal.

* * * * *